United States Patent [19]

Fields et al.

[11] Patent Number: 4,633,042
[45] Date of Patent: Dec. 30, 1986

[54] ELECTRONIC MICRO-CONTROLLER CONVERSION MODULE FOR STEP BY STEP SWITCHING APPARATUS

[75] Inventors: Gary C. Fields; Mark E. Stamos, both of Oakland, Calif.

[73] Assignee: Electrotel, Inc., Ballinger, Tex.

[21] Appl. No.: 634,696

[22] Filed: Jul. 26, 1984

[51] Int. Cl.⁴ ............................................. H04Q 3/02
[52] U.S. Cl. .................................. 379/284; 379/294; 379/296; 379/299
[58] Field of Search ......... 179/18 GA, 18 GD, 18 G, 179/18 ES

[56] References Cited

U.S. PATENT DOCUMENTS

| | | | |
|---|---|---|---|
| 3,532,830 | 10/1970 | Wirsing | 179/18 AB |
| 3,546,393 | 12/1970 | Joel, Jr. | 179/18 B |
| 3,548,110 | 12/1970 | Lundkvist | 179/18 G |
| 3,626,107 | 12/1971 | Armstrong | 179/18 BC |
| 3,673,340 | 6/1972 | Casella et al. | 179/18 J |
| 3,689,703 | 9/1972 | Allen et al. | 179/18 B |
| 3,710,033 | 1/1973 | Whitney | 179/18 BE |
| 3,959,600 | 5/1976 | Sousa | 179/18 BE |
| 3,997,731 | 12/1976 | Wilmot et al. | 179/18 B |
| 4,207,438 | 6/1980 | De Marco et al. | 179/18 G |
| 4,232,199 | 11/1980 | Boatwright et al. | 179/18 B |
| 4,412,282 | 10/1983 | Holden | 364/200 |

OTHER PUBLICATIONS

"The Regenerator 5A—A Microelectronic Project for Strowger Exchanges", Lock et al., *Post Off. Electr. Eng. J.*, (Great Britain), vol. 71 (Oct. 1978), pp. 181-188.
D. Talley, *Basic Telephone Switching Systems*, Hayden Book Co., Inc., Rochelle Park, New Jersey (1979), Chapter 7, pp. 85-102.

*Primary Examiner*—Thomas W. Brown
*Attorney, Agent, or Firm*—David B. Harrison

[57] ABSTRACT

An improved step-by-step switch assembly includes an electronic controller conversion module. A programmed microprocessor responds to incoming pulse trains of widely variant make and break ratios and generates precisely timed and shaped pulses to operate vertical, rotary and release magnets of the switch assembly. Other features include increased loop sensitivity, selective digit absorption and automatic periodic contact wiping to clean all of the contacts of the assembly.

14 Claims, 11 Drawing Figures

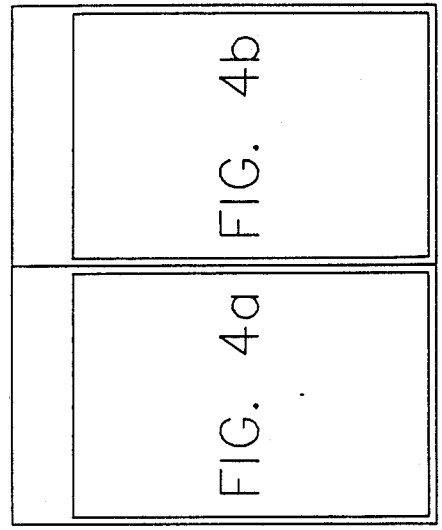
FIG. 3a  FIG. 3b
FIG. 3
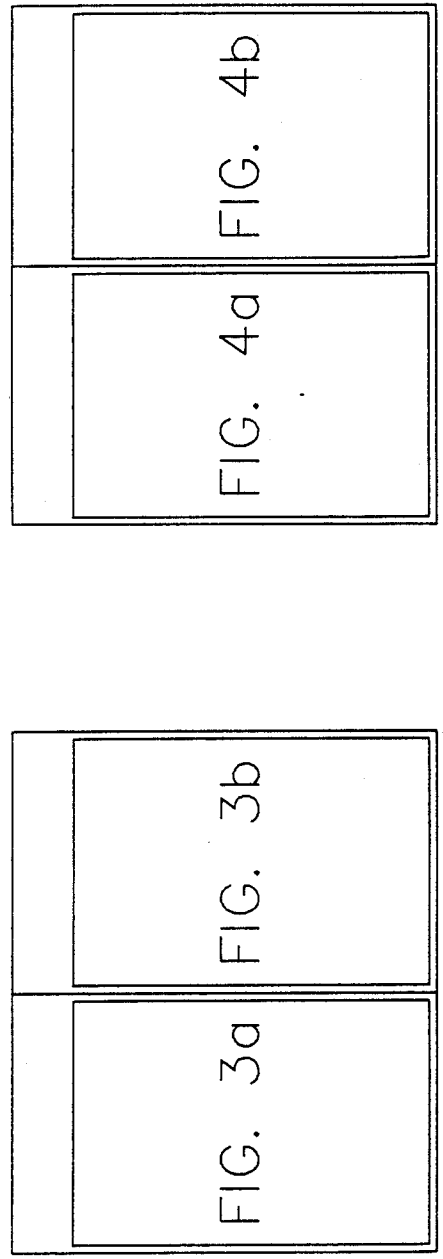
FIG. 4a  FIG. 4b
FIG. 4
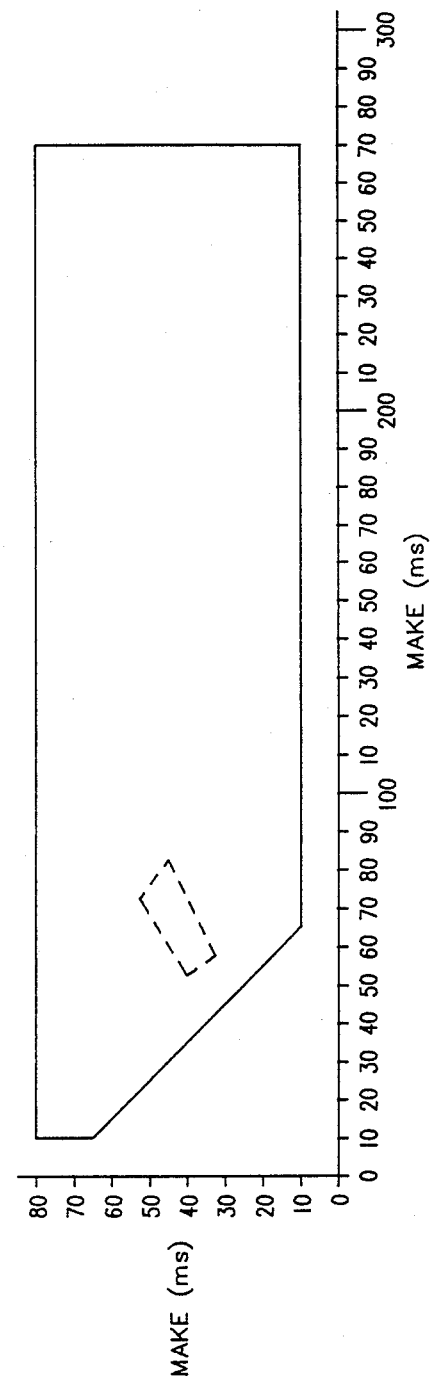
ELECTRONIC STEP SWITCH DIAL PULSE ACCEPTABILITY
FIG. 5

ELECTRONIC MICRO-CONTROLLER CONVERSION MODULE FOR STEP BY STEP SWITCHING APPARATUS

BACKGROUND OF THE INVENTION

The present invention relates to the art of step by step switching apparatus as used for example in telephone switching systems. More particularly, the present invention relates to a step-by step switch which has been improved and updated by inclusion therein of an electronic programmed digital microcontroller conversion module.

Almon B. Strowger invented and patented the first two motion or step-by-step switch in 1981. Since that time Strowger switches have been refined and are still used in a widespread basis in telephone automatic switching systems in this country and throughout the world.

Conventional two-motion stepping switches comprise three basic parts. These parts are a pair of contacts banks, the stepping mechanism and the control relays. Typically each bank of contacts contains 100 positions with two metal contacts (for tip and ring wires on one bank and corresponding control wires on the other) at each position. The stepping mechanism uses three electromagnets, a vertical magnet, a rotary magnet, and a release magnet. In conventional telephone parlance the control relays are identified with letters of the alphabet, with selector switch control relays being identified as "A" through "E" and with connector switch control relays being identified as "A" through "J".

A typical 10,000 subscriber telephone exchange implemented with step-by-step switches includes one or more switching trains comprising a "line finder", a "first selector", a "second selector" and a "connector". When a telephone is taken "off hook" by a party about to make a call, the line finder "finds" the line to which the calling party's telephone is connected and electrically connects to that line. Dial tone is then returned to the calling party's instrument. As the calling party dials each number the rotary dial generates a pulse train for each digit dialed. These pulse trains are applied in turn to operate the first selector, the second selector and the connector switches.

For example, in the case of the first selector, the pulses of the first digit dialed are applied to operate the vertical magnet, and each pulse steps the switch shaft up one vertical position, corresponding to a row of ten contacts. The rotary magnet is then operated by pulses generated at the switch in order to find an available path to a subsequent switch. Each such pulse causes the shaft to rotate one step to each contact position of the selected row. Thus, step pulses are effective to lift the wiper of the shaft to the desired row of contacts and then to rotate the wiper to the desired contact position.

At the completion of the call, when the calling party hangs up, ground is removed from the commonly connected control lead, causing the release magnet of each switch in the train to be momentarily energized. This release magnet then releases the shaft from the position reached by operation of the vertical and rotary magnets. Springs apply bias force to the shaft, so that when the release magnet is energized and the shaft is released, it first rotates out of the row of contacts, and then it drops to its original starting location. The switch is then ready to handle the next call assigned to it.

Over the years such step-by-step switches have worked very well and have proven to be quite reliable. Nevertheless, they have certain weak points and drawbacks. For example, the control relays have typically required more attention, maintenance, adjustment and replacement than have the other elements of these switches. Adjustment of the control relays has required the provision of special tools and highly trained technicians.

Another drawback of the control relays as used in these switches has been their inherent limitation as to sensitivity, measured by the resistance of the overall loop length. Typically, connector switches have only been effective to detect when a called party has answered when the overall loop resistance of the communications path did not exceed 1,500 Ohms.

One more drawback of conventional step-by-step switches was that the actual electrical pulses applied through and by the control relays to the vertical, rotary and release magnet varied both in amplitude and in duration, depending upon such factors as the loop resistance to a particular calling party's instrument, the characteristics of the rotary dial of that instrument, and so forth. With deregulation of the telephone interconnect industry, many rotary dial instruments are now being offered for service, and their low cost dial switches require far greater operating margins than heretofore.

Yet another drawback of conventional step-by-step switches was the need for constant cleaning of the contacts to assure that the switches did not become corroded and consequently fail in service. Prior practice called for a maintenance person to wipe all of the contacts of these switches at regular intervals to keep them clean.

SUMMARY OF THE INVENTION WITH OBJECTS

One general object of the present invention is to overcome limitations and drawbacks of the prior art step-by-step switches.

Another object of the present invention is to replace all conventional electromechanical control relays of a step-by-step switch with a small electronic controller module which operates under the control of a programmed digital microprocessor in order to generate precise control pulses for operating the vertical, rotary and release magnets of the switch.

Yet another object of the present invention is to reduce maintenance of step-by-step switches by as much as ninety percent (90%).

A further object of the present invention is to increase the sensitivity of step-by-step switching apparatus to accomodate greater loop circuit resistance and thereby extend the effective distance that a subscriber may be located from a central office switching facility, thereby reducing the number of such facilities as more and more subscribers are added to the system.

One more object of the present invention is to extend the useful life of step-by-step switching installations while reducing the amount of time that such installations require skilled operator attention.

Still one more object of the present invention is to provide an automatic mechanism for operating a step-by-step switch to wipe over every contact in order to clean it on a regular interval basis.

Yet one more object of the present invention is to provide a programmed digital microprocessor to process incoming dial pulses of a step-by-step switch in order to correct for errors in rate and duration, to eliminate extraneous noise impulses and to shape such pulses into control signals precisely adapted for proper actuation of the vertical, rotary and release magnets of the step-by-step switch.

Still another object of the present invention is to convert conventional step-by-step switches to universal switches by replacement of the electromechanical control relays with an electronic controller conversion module which includes a digital microcontroller for operating the switch in accordance with a preprogrammed series of instructions in response to incoming conventional control signals.

Still a further object of the present invention is to provide an electronic controller conversion module for converting step-by-step switches to digital control wherein the module is compact, easy to manufacture and program at relatively low cost, far more reliable and maintenance free than the components being replaced thereby, and simple to maintain, should maintenance or reprogramming ever be required.

These objects are achieved in a step-by-step switch which includes an electronic controller conversion module having an input connection circuit for connecting the module to a source of control signals such as conventional telephone dialing pulses, an output electronic driver circuit connected to the vertical, rotary and release magnets of the switch, and a digital microcontroller operating under the control of a stored control program of instructions, the microcontroller being connected to receive the control signals, process the control signals and apply them to the output driver in order to operate the vertical, rotary and release magnets. Preferably, the module is packaged as a small printed circuit board for mounting within the housing of a conventional step-by-step switch in place of the electromechanical control relays which are thereby replaced, both physically and functionally. The module may be programmed to act as a universal selector switch controller, or a connector switch controller, and as a selector switch controller the module may include digital absorption circuitry for absorbing up to three predetermined initial digits in a dial up sequence such as seven digits. The module preferably includes timing circuitry and programming to carry out automatic wiping of all contacts of the switch on a timed interval basis to achieve automatic cleaning of the contacts. The module preferably includes pulse processing circuitry to extend the useful sensitivity of the switch to circuit loops having as much as 4000 Ohms of loop resistance, or more; and to correct incoming pulse series for errors in pulse rate and/or duration caused by defective or non-standard rotary dial mechanisms.

The method of the present invention provides electronic digital control of a step-by-step switch assembly by performing the steps of:

receiving control signals including dial up pulse trains, digitally processing such signals to remove errors and to retime such signals, and applying processed signals to operate the vertical, rotary and release magnets of the switch assembly under the control of a programmed digital microprocessor.

Another aspect of the method of the present invention is the conversion of a conventional step-by-step switch assembly to one operating under the control of a programmed digital microcomputer conversion module, comprising the steps of:

removing all electromechanical control relays from the assembly other than the vertical, rotary and release magnets thereof, installing and connecting the conversion module in lieu of the removed control relays, receiving and processing incoming control signals in accordance with the program controlling the conversion module, and controlling the vertical, rotary and release magnets by signals processed and put out by the module.

These objects, advantages and features of the present invention will be further understood and appreciated by considering the following detailed description of preferred embodiments, presented in conjunction with the accompanying drawings.

BRIEF DESCRIPTION OF THE DRAWINGS

In the Drawings:

FIG. 3 is a plan of the layout of the FIG. 3A and FIG. 3B drawings to enable them to be read and understood as a single circuit diagram.

FIG. 4 is a plan of the layout of the FIG. 4A and FIG. 4B drawings to enable them to be read and understood as a single circuit diagram.

FIG. 5 is a graphic comparison of step switch dial pulse compatibility achieved with the present invention as compared to the much more restrictive compatibility of conventional switches as superimposed thereon and enclosed by dashed lines.

DETAILED DESCRIPTION OF PREFERRED EMBODIMENTS

Step-by-Step Switch 10

Figure 1:
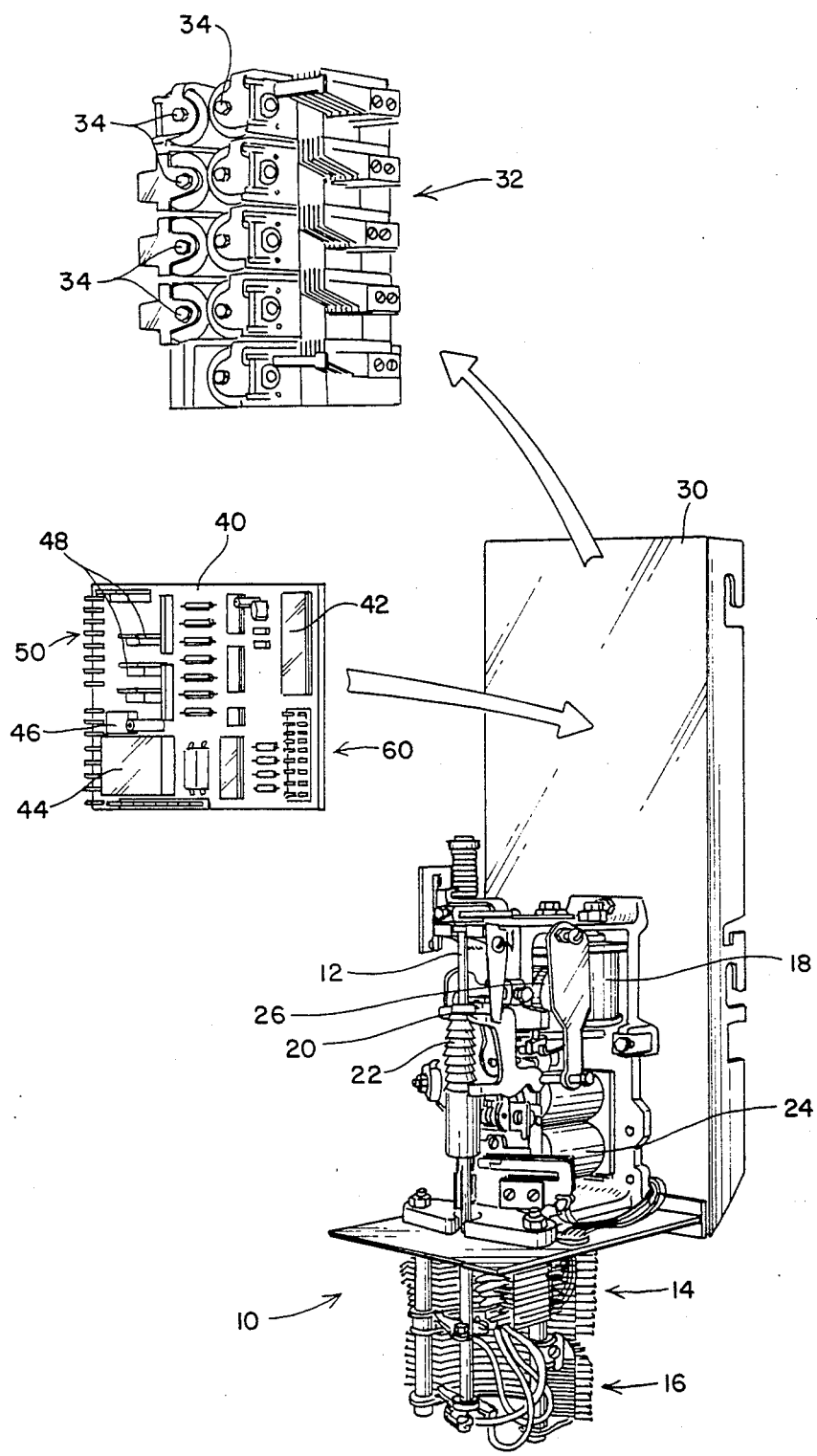
FIG. 1 is a somewhat diagrammatic mechanical view in perspective illustrating the principles of the present invention in converting a step-by-step Strowger switch to electronic control by replacing the conventional control relays with an electronic micro-controller conversion module of the present invention.

A conventional step-by-step or "Strowger" switch 10 is shown in perspective in FIG. 1. Therein, the switch includes a vertical wiper shaft 12, a control contact bank 14 having rows of contacts C and EC, and a line contact bank 16 having corresponding rows of contacts T and R ("tip" and "ring"). Two double contact wipers affixed to the shaft 12 are moved from an index or vertically downward, nonengaged normal position to a particular row of contacts and are then rotated into that row of contacts. The vertical step motion, caused by an incoming first train of dial pulses, is brought about by operation of a vertical magnet 18. The vertical magnet 18 moves a pawl 20 which engages a series of bevelled skirts 22 affixed to the shaft 12. As each skirt 22 is engaged by the pawl 20, the shaft moves up one step position.

After the desired contact row is reached, a rotary magnet 24 steps the shaft in a rotary direction, one step at a time. When the switch 10 is configured as a "selector" switch in a step-by-step dial system, the rotary magnet is operated by electrical pulses which are generated by control circuitry to cause the wiper to land on contacts corresponding to the first available trunk to a following selector switch or to a connector switch. When the switch 10 is configured as a "connector" switch, the rotary magnet is operated by the last dial pulse train of the number being dialed, which moves the wiper contacts to the contact pair for the subscriber being called.

At the completion of a call, a release magnet 26 releases latches set by the vertical and rotary magnets 18 and 24, and the shaft 12 rotates the wipers to the disengaged position and then drops the shaft 12 to the index position.

These general principles of step-by-step switches are well understood by those skilled in the art, and are explained in much greater detail in David Tally's book entitled *Basic Telephone Switching Systems*, published by Hayden Book Co., Rochelle Park, N.J., (1979) particularly in Chapter 7 entitled "Step-by-Step Dial System".

Each conventional step-by-step switch 10 includes a frame 30 to which the electromechanical elements thereof are secured. One region of the frame 30 is for electromagnetic control relays 32 which are used to operate the switch 10 in accordance with incoming control and dial pulse signals and further in accordance with the state of the switch 10 from time to time.

One significant drawback of the relays 32 is that they require almost constant maintenance attention and adjustment. For example, an adjustment screw 34 is provided on each relay 32 for adjusting the amount of throw of the armature during activation. The contacts of the relays 32 are exposed to the air and corrode, requiring periodic cleaning.

In accordance with the present invention, the conventional relays 32 are removed from the frame 30 and are replaced by a small printed circuit module 40 containing a programmed microprocessor 42 with associated driver electronics and sealed micro relays 44 and 46. Electronic switches 48 are used to operate the vertical, rotary and release magnets 18, 24 and 26. Contact pins 50 enable the module 40 to be connected with the switch 10, and facilitate configuration of the digit absorption feature.

Electronic Selector Conversion Module 60

Figures 2, 2A:
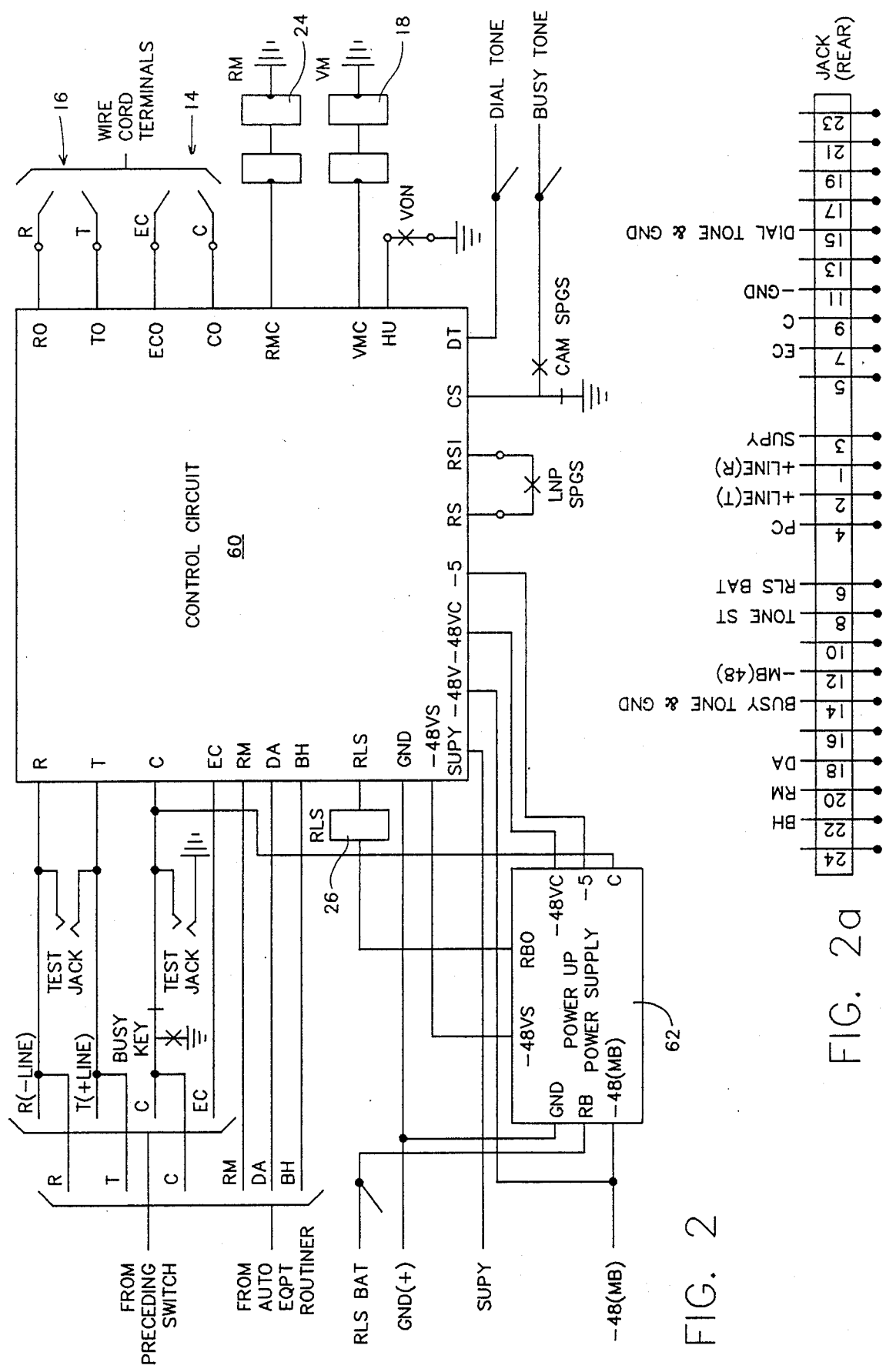
FIG. 2 is an electrical block diagram showing the connection of the conversion module to the step-by-step switch.
FIG. 2A diagrams jack connections for connecting certain signal lines to the conversion module of FIG. 1.
Figure 3A:
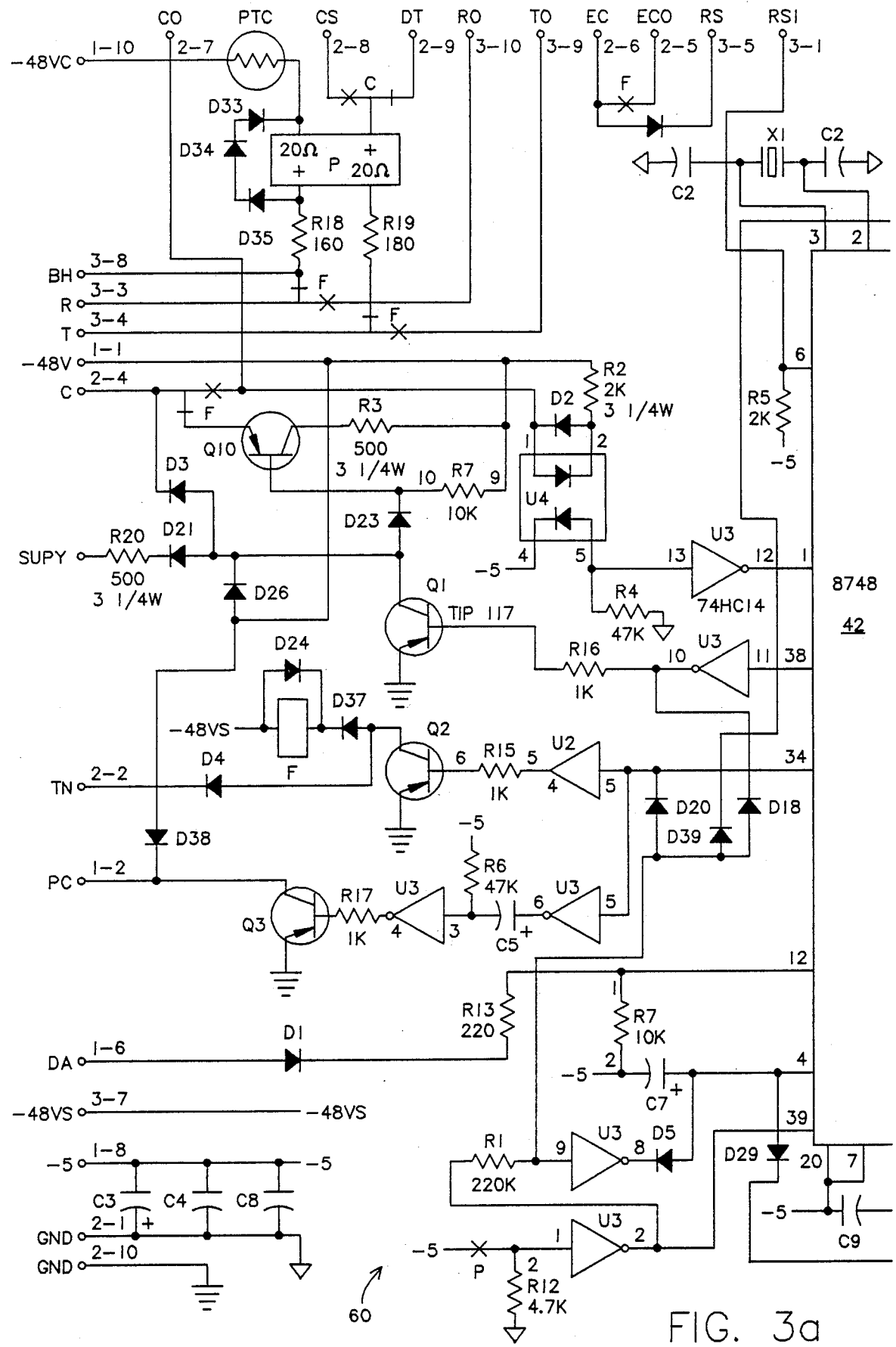
FIGS. 3A and 3B comprise together a more detailed electrical schematic diagram of a conversion module of the present invention configured for service as a "selector" switch.
Figure 3B:
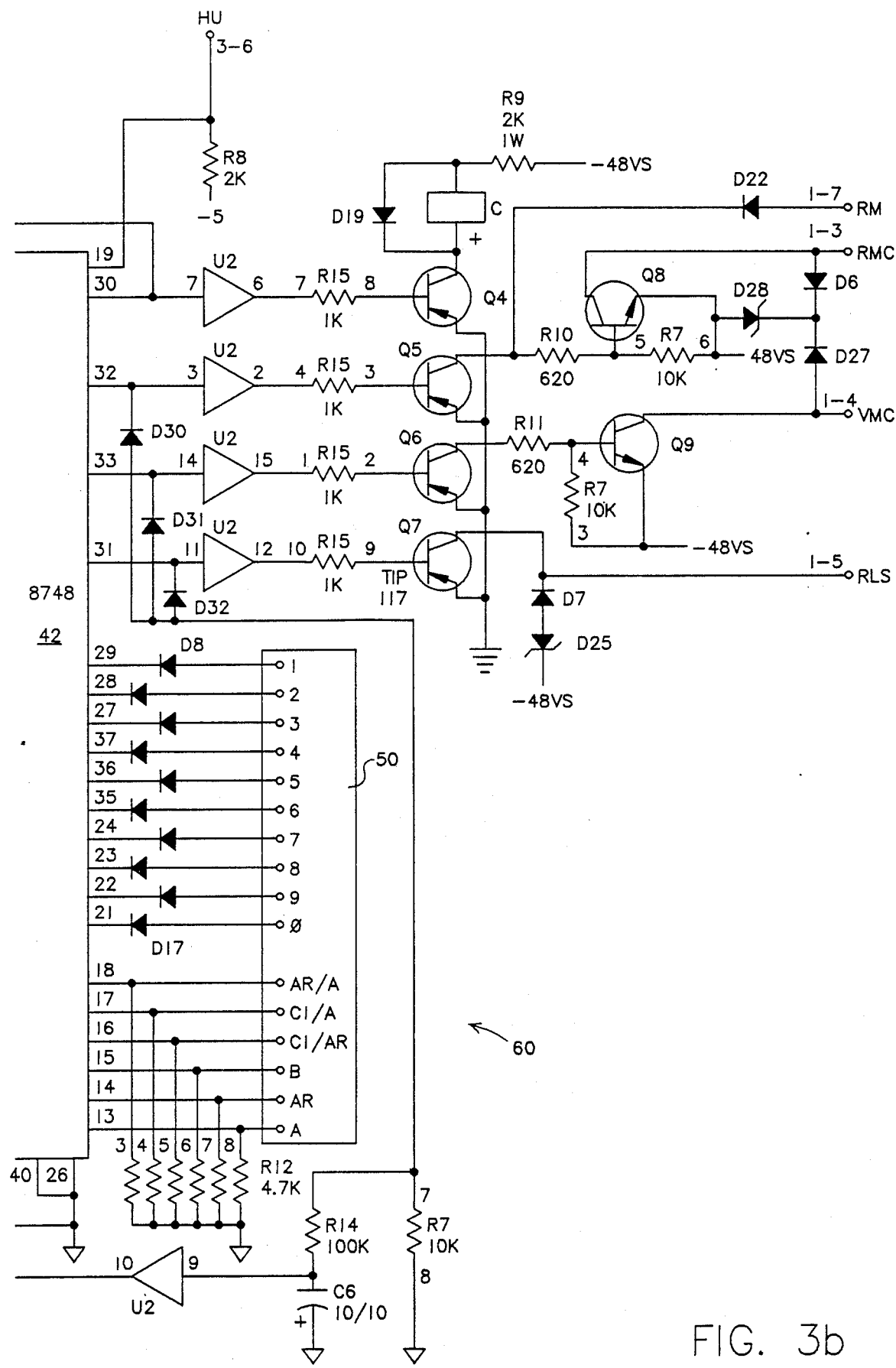

An electronic selector switch conversion module 60 is depicted structurally in FIGS. 1 and 2 and by the electronic block and schematic drawing of FIGS. 3A and 3B. Referring to FIG. 2, signals appearing on R, T and C lines from a preceding switch enter the R, T and C lines of the module 60. Test jacks and a busy key are also provided on the frame 30 in accordance with conventional practice.

Certain control lines are provided for connection of the module 60 to routiner equipment including rotary magnet RM, disable digit absorption DA, and loop circuit BH lines which enable the switch 10 to be operated manually for test and adjustment purposes.

Further connecting lines are provided to the release magnet battery supply RLS BAT, to ground GND, to supervisory SUPY, and to the −48 volt system supply −48 (MB). A restricted service RS and RSI loop is provided which is interrupted by left normal post springs. A cam springs line CS is normally grounded but when operated applies busy tone if the eleventh contact position of any row is reached during rotary stepping of the switch 10. Dial tone is applied through the dial tone line DT. A vertical off normal VON switch is operated any time the shaft 12 is not in its idle, resting position.

A hang up HU line is connected through the VON switch contact to ground whenever the shaft is "off normal". This signal is important in the sense of telling the module 60 if the switch 10 has become hung up or stuck in an off normal position, even though the release magnet 26 has been actuated.

Connections are also provided to the vertical magnet 18 over a vertical magnet coil VMC line, to the rotary magnet 24 over a rotary magnet coil RMC line, and to the release magnet 26 over a release line RLS.

Wiper lines ECO and CO extend to the wiper contacts of the control bank 14, and tip and ring lines T and R extend to the wiper contacts of the line bank 16.

A switching power supply 62 is provided to convert the minus 48 volt system supply potential to a minus 5 volts for operating the microprocessor in the module 60. The power supply 62 is turned off when the switch 10 is in an idle condition, and the supply 62 is turned on if either a loop condition is established on tip T and ring R, or if the control C lead is grounded which indicates that the switch 10 is already connected to another switch.

Referring now to the electrical schematic for the module 60 as depicted in FIGS. 3A and 3B, an input impedance of 200 Ohms per leg on tip and ring is maintained with low wattage resistors R18 and R19. A 20 Ohm positive temperature coefficient PTC device in series with one side of a P relay limits current in case someone inadvertently grounds either tip or ring in the central office where resistances are low.

The P relay functions to seize the switch 10. When the P relay operates in response to an incoming pulse on tip and ring, a −5 volt pulse is applied at the input pin 1 of a Schmidt trigger buffer array U3. The output pin 2 thereof is connected to a data bit input port pin of an 8748 Microprocessor as made by Intel Corporation, or equivalent.

A switch attempting to connect to the switch 10 must first see a condition on the control C lead other than ground in order to seize the switch 10. A −48 volt signal is preferred to an open condition. If the switch 10 is not previously seized, the −48 volts is applied to the C lead by passing through a conducting transistor Q10. The microprocessor 42 constantly monitors the data status at pin 39 and responds to an incoming pulse by putting out a control pulse at pin 38, which passes through a buffer of the U3 array, pins 11 and 10 and which activates a transistor Q1, causing it to conduct. When Q1 conducts, the base of transistor Q10 is brought low, which turns Q10 off, removing the −48 volts. The C lead is thereupon grounded through a diode D3, and the switch 10 is now seized by the incoming switch.

Upon switch seizure, the microprocessor 42 initiates a timer. If dial pulse trains do not arrive within e.g. 30 seconds, the rotary magnet 24 is commanded to rotate to the 11th position to tell the customer that the switch is busy and to hang up. Dial pulses operate the P relay, and the pulses are put into the microprocessor 42 at the data bit input provided at pin 39. The microprocessor 42 analyzes each pulse. If it is greater than 10 msec. in duration, the microprocessor generates a precisely timed step pulse and actuates the vertical magnet 18 with it. The dial pulse train thus causes the shaft 12 to step vertically to the row of contacts corresponding to the number of pulses in the train. The rotary magnet is then operated by the microprocessor 42.

The availability of the next following switch is tested by operation of an optoisolator U4. This isolator has its LED input normally connected to the CO line which looks at the control contact of each following selector switch in the switch train. As a ground is encountered in step rotation among the contacts corresponding to next selectors, the LED emits and the microprocessor senses this emission by a pulse at its pin 1. The microprocessor 42 then commands the rotary magnet to step to the next contact position, until a control C contact is encountered which is not grounded.

When an available subsequent switch is encountered, the microprocessor 42 operates an F relay by putting out a control signal at its pin 34. The F relay cuts the transmission path, tip and ring, through to the now seized next switch. In addition, it cuts the C lead through to the next switch, so that the ground from the previous switch is now passed to the following switch on the C-CO line. The optoisolator U4 continues to monitor the status of the C-CO line. In order to test whether the next following switch has properly responded to the ground condition on the CO line to which it is now attached, the microprocessor 42 commands the F relay to operate momentarily. If the ground condition is lost during this momentary test, indicating that the next following switch has not actually been seized, the microprocessor commands the rotary magnet to step to another available switch.

Once the microprocessor 42 is satisfied that the next following switch has been effectively seized, it operates the F relay for the duration of the call. In addition, a peg count PC single pulse signal is put out to a jack on the switch 10 through two buffer stages of U3 (pins 5-6 and 3-4) and a transistor Q3 and is available to indicate that a calling path has been successfully established through the switch 10. The peg count is used to monitor traffic to be sure that the central office is connected in the most efficient switching configuration, as is well understood in the art.

The microprocessor 42 energizes the vertical magnet coil by putting out a control signal at pin 33 which is buffered through an output buffer (pins 14-15) of an array U2 and ultimately turns on a driver transistor Q6. The driver Q6 operates a high current switch transistor Q9 in series with the vertical magnet coil VMC and the −48 volt supply. Similarly, the rotary magnet 24 is energized when the microprocessor 42 puts out a control signal at its pin 32, the signal being buffered through a buffer (pins 3-2) of the array U2 before operating a driver transistor Q5. The transistor Q5 operates a high current switch transistor Q8 in series with the rotary magnet coil RMC and the-48 volt supply. The release magnet 26 is actuated when a signal is put out at pin 31 of the microprocessor 42, is buffered through a buffer (pins 11-12) of the array U2, and operates a switch transistor Q7 to ground momentarily the coil of the release magnet which is normally connected to −48 volt supply through diode D7 and zener D25. Operation of the vertical, rotary and release magnets is monitored by the microprocessor 42 by a circuit path through diodes D30, D31 and D32 and a buffer (pins 9-10) of the array U2 and another diode D 29 to an input pin 4 of the microprocessor 42.

A bank of digit absorbing control pins 50 is provided on the module 60. If a digit is programmed to be absorbed, by appropriate strapping of the panel 50, dial tone must be removed when the absorbed digit is dialed. In order to remove dial tone, a dial tone relay C is actuated by the microprocessor 42 by putting out a control signal at its pin 30. The signal is buffered through a buffer (pins 7-6) of the array U2 and passed on to operate a current switch Q4 in series with the coil of the C relay.

In a non-digit-absorbing switch, the C relay operates somewhat differently. The C relay released puts dial tone on tip and ring, whereas when it is operated, busy tone is placed on the loop.

Different control signals may be strapped to cause digits to be absorbed. The absorb control A when strapped to a digit will cause that digit to be absorbed (disregarded) if it is the first digit dialed. The absorb repeatedly AR control causes a digit to which it is strapped to be absorbed repeatedly ad infinitum. The block level control causes the wiper to move to the eleventh or busy position of the row corresponding to the digit(s) to which the B signal is strapped. The cut in CI/A, CI/AR and absorb repeatedly/absorb AR/A signals operate in a known manner to provide further flexibility and programmability to the switch 10 than has been heretofore achieved by its electromechanical predecessor. It is important to note that the program conditions established by the strapping appearing at pin bank 50 are constantly monitored by the microprocessor 42 which operates the switch 10 in accordance with the conditions set by the straps and the control program. Strapping of multiple control signals to a single digit position may require use of one-way diodes to isolate each control signal from the other(s).

The microprocessor clock is held to a particular frequency by a crystal X1. The 8748 microprocessor contains an internal read only memory into which a suitable control program may be loaded.

Connector Module 80

Figure 4A:
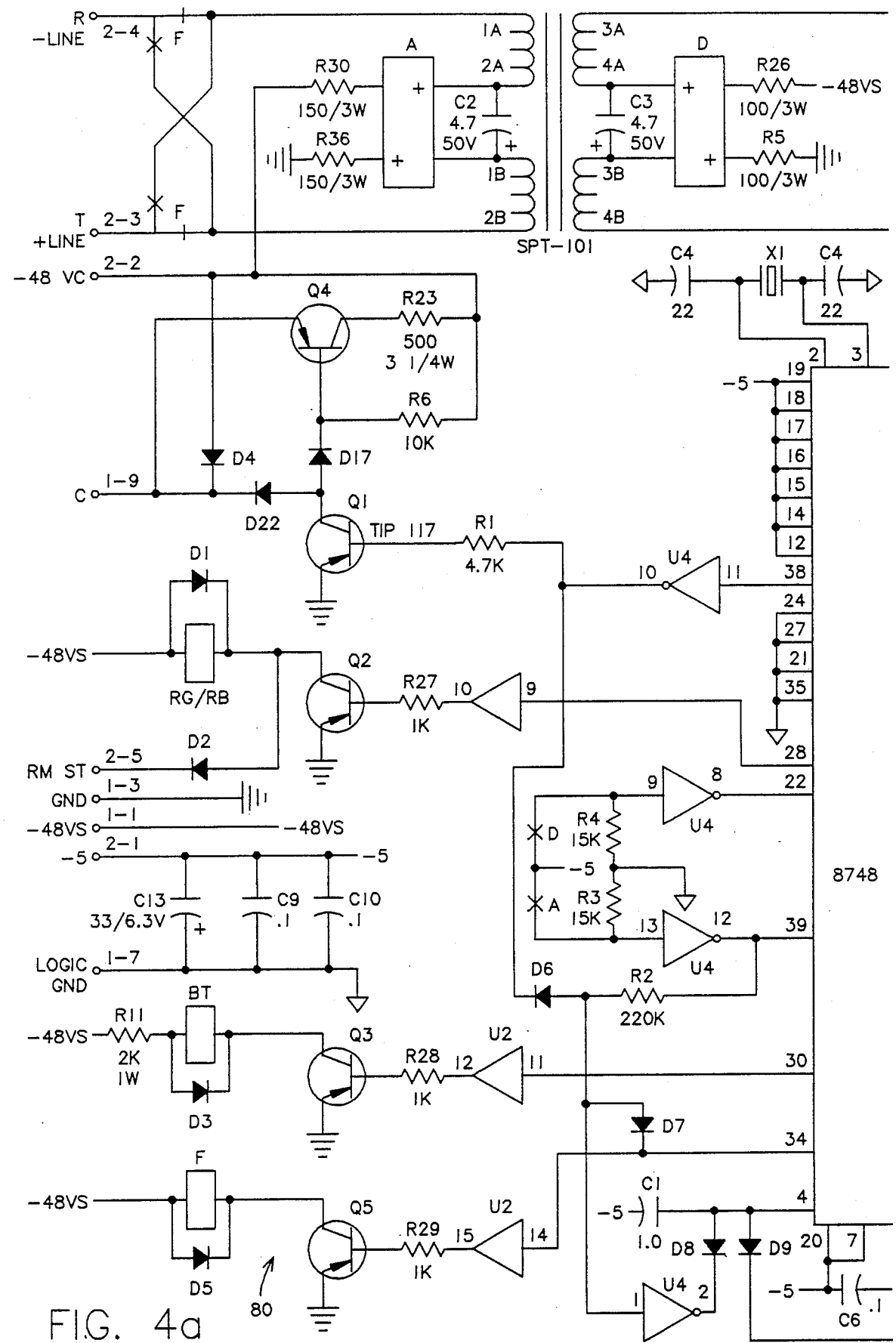
FIGS. 4A and 4B comprise together a more detailed electrical schematic diagram of a conversion module of the present invention configured for service as a "connector" switch.
Figure 4B:
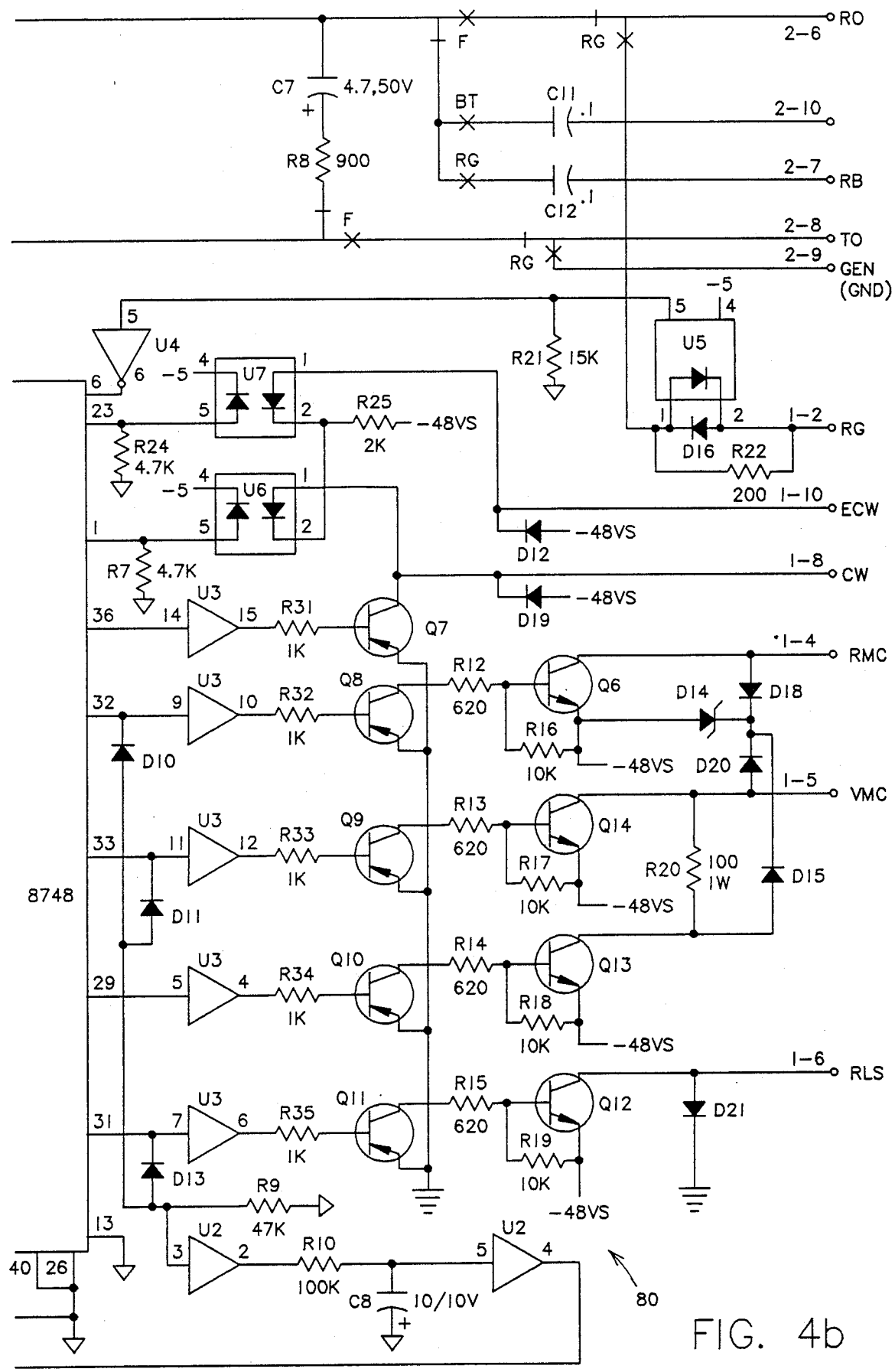

A switch conversion connector module 80 for use with a connector switch is shown in FIGS. 4A and 4B. Therein, many circuit elements are the same as for the selector module 60 and will not be discussed again. Tip and ring lines enter the module 80 and are met with a solid impedance termination provided by a one-to-one isolation transformer SPT-101 and a series capacitor C2.

When the connector module 80 is seized by closure of the loop between tip and ring, the A relay operates, causing a pulse to pass through a Schmidt trigger buffer (pins 13-12) of an array U4 to an input bit port (pin 39) of the microprocessor. This pulse causes the microprocessor to put out a pulse at pin 38 which passes through a buffer (pins 11-10) of the array U4 to operate a driver transistor Q1 which in turn grounds the C line back to the previous selector switches in the switch train.

If a digit is not received within e.g. 30 seconds the microprocessor automatically operates a "busy tone" relay BT, and the caller is forced to hang up and replace the call, thereby freeing the system from callers who tie up switching equipment without completing the dialing sequence (e.g. children playing with the telephone). If a digit pulse train is received, the microprocessor processes the digit and puts out precise pulses to command the vertical magnet 18 to move the shaft 12 up to the appropriate level where it stops, waiting for a second digit. If a second digit is not received in e.g. 30 seconds, the microprocessor times out and rotates the wiper to the busy position. If the second digit pulse train is received, the microprocessor processes the incoming pulses and puts out precisely timed pulses to the rotary magnet 24 to cause the wiper to step to the selected final contact position corresponding to the value of the second (final) digit. This contact position corresponds to and connects with the called party's telephone line.

If the called party is using the telephone, the CW line will be grounded, and this condition will be sensed by the microprocessor by virtue of a signal passing through an optoisolator U6. If the called party's line is not busy, the microprocessor then operates the ring generator relay RG/RB by putting out a signal at a pin 28, buffering the signal by a buffer (pins 9-10) of the array U2 and operating a relay switch transistor Q2. The ring generator relay grounds the tip line and puts a 90 volt, 20 Hz ringing signal on the ring line. An optoisolator U5 senses the ringing current on the called party's loop and passes it on to the microprocessor (through a buffer (pins 5-6) of the array U4) which monitors the ringing waveshape. When the called party answers, the waveshape changes by becoming wider, and this change is used by the microprocessor to detect the answer. If the called party goes "off hook" (i.e. answers) during the non-ringing interval, a change in called party loop voltage is sensed by the optoisolator U5 and this condition is provided to the microprocessor.

Whenever a change in pulse width or amplitude is detected, the microprocessor closes an F relay for 20 msec, and the called party's line is tested to see if the called party's instrument really came off hook by virtue of operation of the D relay. If the customer has not really come off hook, ringing is resumed after the 20 msec test interval. This brief test interval goes unnoticed by the telephone system users.

If the D relay has operated by virtue of a closed loop to the called party, the microprocessor removes the ringing signal by deenergizing the RG/RB relay, and continues to operate the F relay. The F relay reverses the tip and ring connections on the incoming side of the connector 80. This reversal is used conventionally to signal preceding equipment that the call path has been completed and to start charging the customer if it is a toll call. Use of more sensitive D relays, together with use of the optoisolator U5 to monitor ringing conditions to detect answering by the called party increases the called party loop sensitivity from about 1500 Ohms to as much as 4000 Ohms or more, the limiting factor becoming the attenuation of the talk path signal strength. Of course, to increase overall loop sensitivity in a system, equivalent measures must be taken with line finder equipment so that distant subscribers will be able to place calls as well as receive them.

Trunk hunting is accomodated by virtue of monitoring of the ECW line, which marks the first line of a multiple line trunk. If the first line is busy (as established by the presence of a ground) the microprocessor senses this condition through an optoisolator U7 and steps rotary magnet to the next contact position, and so forth until an available line in the trunk is found. If an available position is not found in the group, the wiper is stepped to the eleventh or busy position and a busy signal is returned to the caller.

For trunk hunting in line groups in excess of ten, the connector module 80 operates by actuating the release magnet RLS and at the same time operating the vertical magnet VMC with a reduced current, so that the vertical position is maintained while the rotary position is returned to normal. A switch transistor Q13 is commanded by the microprocessor to apply a reduced current through the coil of the vertical magnet to maintain the current row position after the rotary magnet is released. Then, the vertical switch transistor Q14 is operated and steps the shaft up one vertical step to the next row, where line hunting resumes until an available line is found or until the supply of lines is exhausted, whereupon a busy signal is sent out.

Pulse Processing

Figure 6:
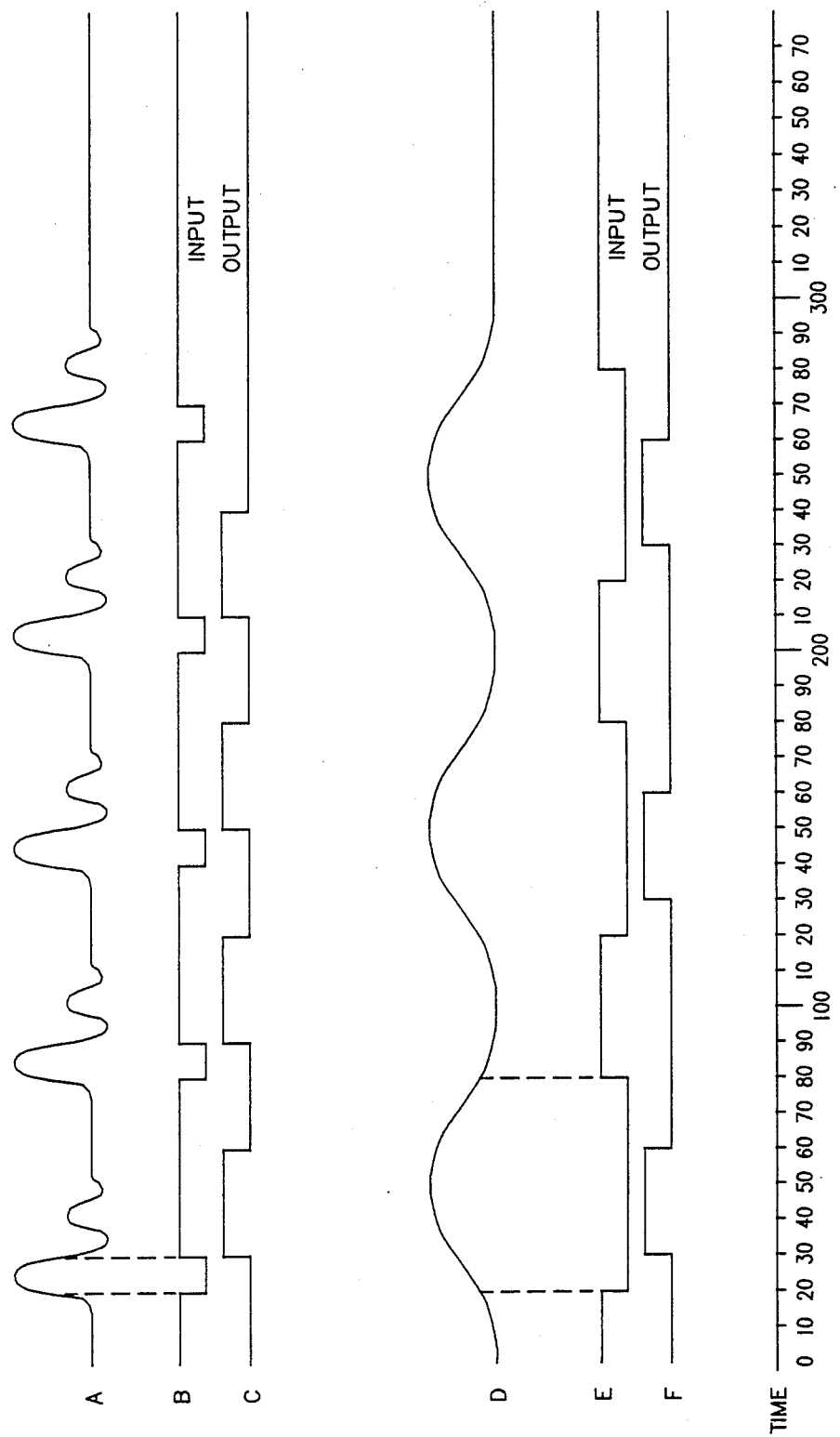
FIG. 6 is a graph of waveforms illustrating uniform electronic dial pulse processing achieved with the present invention in comparison to two widely variant incoming analog pulse trains.

Advantageous operation of the microprocessor in processing dial pulses may be appreciated by considering FIGS. 5 and 6. Therein, an ideal dial pulse is identified as having a 40 msec make time and a 60 msec break time (with a ten pulse per second dial pulse rate, 60 percent is break and 40 percent is make). According to telephone system standards, dial pulses may not vary much from this ideal pulse configuration. The telephone standard margin for error is indicated as lying within the timing region bounded by dashed lines in FIG. 5.

The much greater area bounded by solid lines in FIG. 5 depicts the much wider latitude for dial pulses which may be accomodated by employing the principles of the present invention. This wide margin is further illustrated in FIG. 6 wherein waveform A depicts a very severe dial pulse condition wherein the make period is but 10 msec, and the break period is 90 msec. This narrow pulse is shaped by the Schmidt trigger into the squared waveform depicted in waveform B, and the rising edge of waveform B is used by the microprocessor to time the start of the output pulse train, waveform C, which is restored to an ideal 40 msec make, 60 msec break condition.

Waveform D is much more conventional, and represents a condition wherein a longer make pulse is processed, waveform E, and results in a constant 30 msec make pulse, waveform F.

In both cases, the microprocessor has converted analog pulses of widely variant duration into precise driving pulses for the vertical and rotary magnets, thereby minimizing improper operation of the step-by-step switch 10.

Control Programs

Here follows two listings in assembly language of computer control programs. The first program is adapted to operate the selector module 60 and the second program is adapted to operate the connector module 80, both in accordance with the principles of the present invention. Each program is prestored in the read only memory portion of the 8748 controller microprocessor.

ELECTRONIC SELECTOR SWITCH
May 23, 1984

```
;ES 1.04
;THIS VERSION SUPPORTS:
;       1.      FIRST SELECTORS WITH DIGIT ABSORBING
;       2.      SELECTORS WITHOUT DIGIT ABSORBING
;
;CHANGES:
; 05/23/84      ES 1.04
;       This version contains two changes. First, new code opens the
;       "C" lead for 500MS if the caller remains on the line longer than 30
;       seconds after the switch has rotated to busy. Second, the "ARCI"
;       option of digit absorbing selectors is removed. Pin 19 of the 8048
;       (formerly ARCI) is now used as an input for vertical off normal (VON)
;       contacts if they are installed. A new routine has been added for
;       checking these contacts, and will:
;               1. RETURN IF PIN 19 = 0
;               2. FORCE "C" & "SUPY" TO 0
;               3. CALL REL ROUTINE IF PIN 19 = 1
;               4. RECHECK PIN 19
;               5. RETURN IF PIN 19 = 0
;               6. CALL REL (A SECOND TIME) IF PIN 19 = 1
;               7. RECHECK PIN 19
;               8. RETURN IF PIN 19 = 0
;               9. GO TO 7 IF PIN 19 = 1
;       NOTE: The switch gets traped in the loop at the end of the
;       routine, (steps 7,8 & 9) until the stuck switch is released by hand
;       (VON = 0) the "C" & "SUPY" leads remain grounded until the switch
;       is released.
;
; 05/08/84      ES 1.03
;       Added two lines of code to check for a high at pin 6 at the routine
;       "LONGMAK" if pin 6 is high the switch acts as if it is on a blocked
;       level. If the pin is low the switch continues per the marking
;       options or to "CUTIN" if the switch is marked as a non-absorbing
;       selector.    SEE: [5/8/84 MES]
;
; 03/07/84      ES 1.02
;       Changed a delay in the CUTIN routine from 6MS to 1MS to prevent
;       the line finder from dropping off while the C lead is tested.
;
; 01/05/84      ES 1.01
;       First release of code for selectors.
```

ELECTRONIC SELECTOR SWITCH
EQUATES & DEFINITIONS

```
0000            FALSE   EQU     0
FFFF            TRUE    EQU     NOT FALSE

;ASSEMBLY OPTIONS

0000            AUTOCLN EQU     FALSE   ;TRUE = PROGRAM FOR 19 HOUR AUTO CLEAN

;EQUATES

JLCD    OPSYN   JT1     ;JUMP IF LINE CURRENT DETECTED
                JNLCD   OPSYN   JNT1    ;JUMP IF NO LINE CURRENT DETECTED
                JMAK    OPSYN   JT1     ;JUMP IF MAK (DIAL PULSE)
                JBRK    OPSYN   JNT1    ;JUMP IF BREAK (DIAL PULSE)
                JGCL    OPSYN   JT0     ;JUMP IF C LEAD IS BUSY (GROUNDED)
                JOCL    OPSYN   JNT0    ;JUMP IF C LEAD IS NOT GROUNDED
                JFAB    OPSYN   JF0     ;JUMP IF DONE FIRST ABSORB
                JNAB    OPSYN   JF1     ;JUMP IF NON-ABSORB FLAG IS SET
                JTIME   OPSYN   JTF     ;JUMP ON TIMER FLAG
                JVON    OPSYN   JB7     ;JUMP IF VERTICAL OFF NORMAL

;BUS BITS USED WITH DIGIT ABSORBING SELECTORS
                JDA     OPSYN   JB0     ;JUMP IF ACTIVE DA LEAD AT BIT 0 OF BUS
                JAO     OPSYN   JB1     ;JUMP IF ABSORB ONCE
                JAR     OPSYN   JB2     ;JUMP IF ABSORB REPEATEDLY
                JBL     OPSYN   JB3     ;JUMP IF BLOCKED LEVEL
                JCIAR   OPSYN   JB4     ;JUMP IF DUAL MARKED CUT IN/ABSORB REPEATEDLY
                JCIAO   OPSYN   JB5     ;JUMP IF DUAL MARKED CUT IN/ABSORB ONCE
                JARAO   OPSYN   JB6     ;JUMP IF DUAL MARKED ABSORB REPEATEDLY/ABSORB ONCE
```

```
                ;RELAY BITS
0008    CRLY    EQU     00001000B       ;C RELAY CONTROL BIT
0010    RLSM    EQU     00010000B       ;RELEASE MAGNET
0020    RMAG    EQU     00100000B       ;ROTARY MAGNET
0040    VMAG    EQU     01000000B       ;VERTICAL MAGNET
0080    FRLY    EQU     10000000B       ;F RELAY
0080    SUPY    EQU     10000000B       ;SUPY LEAD
```

ELECTRONIC SELECTOR SWITCH
RESET AND START UP

```
                ;THE PROGRAM STARTS HERE AT THE OCCURENCE OF A HARDWARE RESET WHEN THE
                ;SWITCH IS SIEZED AND JUMPS HERE WHEN THE SWITCH IS RELEASED. IN ORDER
                ;FOR THE PROGRAM TO PASS THE LOCK ROUTINE LINE CURRENT MUST BE DETECTED
                ;FOLLOWING A RESET. ONCE THE SWITCH ENTERS THE LOCK ROUTINE IT REMAINES
                ;CAUGHT IN THE LOOP UNTIL A RESET OCCURES.

0000            ORG     0
0000    RESET   EQU     $                       ;EVERYTHING STARTS HERE
0000 23FF       MOV     A,#0FFH                 ;INITIAL VALUE FOR PORT 1
0002 39         OUTL    P1,A
0003 C5         SEL     RB0
0004 B5         CLR     F0
0005 A5         CLR     F1
0006 65         STOP    TCNT
0007 344B       CALL    VONCK                   ;BEGIN CHECK FOR VON (RETURNS WITH BUS IN A)
0009 5301       ANL     A,#01H
000B C60E       JZ      RESET1                  ;DO NOT FLAG IF ABSORBING SELECTOR
000D B5         CPL     F1                      ;SET NON-ABSORB FLAG
000E 5615 RESET1 JLCD   INUSE                   ;BEGIN A CALL IF LINE CURRENT IS ON

0010    LOCK    EQU     $
0010 237F       MOV     A,#07FH                 ;INITIAL VALUE FOR PORT 2
0012 3A         OUTL    P2,A
0013            IF      AUTOCLN
0013    LOCK1   EQU     $
0013            JMP     LONGCNT                 ;GO TO 19 HOUR COUNTDOWN
0013            ELSE
0013    LOCK1   EQU     $
0013 0413       JMP     LOCK1
0015            ENDIF
```

ELECTRONIC SELECTOR SWITCH
WAITING FOR START OF PULSE TRAIN

```
                ;IF THE PROGRAM ENTERS THIS AREA IT MEANS THAT LINE CURRENT WAS DETECTED
                ;AT RESET1. THIS SWITCH IS NOW RESPONSIBLE FOR HOLDING UP THE C LEAD
                ;AND MUST SIGNAL ALL OTHER SWITCHES THAT IT IS IN USE.

0015    INUSE   EQU     $
0015 8A80       ORL     P2,#SUPY                ;GROUND SUPY & C LEADS OF PREVIOUS SWITCHES
0017 761B       JNAB    SETCNT                  ;SKIP ABSORB TABLE BUILD IF NON-ABSORB TYPE
0019 14EE       CALL    TABLE                   ;BUILD DIGIT MARKING TABLE

;THIS SWITCH WILL WAIT UP TO 34 SECONDS FOR A DIGIT TO BE DIALED, OR RESET
                ;ITSELF IF THE CALLER HANGS UP THE PHONE (LINE CURRENT IS REMOVED).

001B    SETCNT  EQU     $                       ;SET UP 34 SECOND TIMER
001B BB04       MOV     R3,#04H
001D 23FF       MOV     A,#0FFH
001F AC         MOV     R4,A
0020 349F       CALL    TIMR                    ;START THE TIMER

0022    WFBRK   EQU     $                       ;LOOP HERE WAITING FOR BREAK
0022 4646       JBRK    SOBRK                   ;       MOVE TO START OF BREAK AREA
0024 1628       JTIME   WFBRK1                  ;END OF TIME CYCLE
0026 0422       JMP     WFBRK
0028 EC22 WFBRK1 DJNZ   R4,WFBRK                ;MORE CYCLES TO COUNT
002A EB22       DJNZ    R3,WFBRK                ;MORE CYCLES TO COUNT
```

;ONCE THE TIMER HAS HAS RUN OUT 255*4 TIMES (VALUE OF R4*R3) WITH OUT
;THE DETECTION OF A BREAK THE SWITCH MOVES TO THE BUSY POSITION. THE
;C RELAY IS ENERGIZED TO APPLY THE BUSY TONE. NOTE: IN AN ABSORBING
;SELECTOR THE BUSY TONE IS INHIBITED BY THE OPEN CAM SPRINGS UNTIL
;THE CONTACTS ARE AT THE ELEVENTH POSITION.

```
002C            TIMOUT  EQU     $
002C 99F7               ANL     P1,#NOT CRLY    ;ENERGIZE C RELAY (BUSY POSITION)
002E 343E               CALL    VERT            ;CLIMB 1 VERTICAL LEVEL
0030 BA0B               MOV     R2,#0BH         ;COUNT OF REQUIRED ROTARY PULSES
0032 3492               CALL    DLY5
0034 3433    TIMOUT1    CALL    HORZ            ;ROTATE 1 POSITION
0036 EA34               DJNZ    R2,TIMOUT1      ;ROTATE TO BUSY

;ONCE IN THE ELEVENTH POSITION THE PROGRAM LOOPS HERE UNTIL THE CALLER
             ;HANGS UP.  A HANGUP IS DETECTED BY THE LOSS OF LINE CURRENT SINCE THE
             ;C LEAD HAS NOT YET BEEN GROUNDED BY A NEXT SWITCH.  A LOSS OF LINE
             ;CURRENT LESS THAN 400 MS IS IGNORED.

0038         WFHUP   EQU     $
0038 99F7            ANL     P1,#NOT CRLY    ;ENERGIZE C RELAY IF NOT ALREADY (BUSY)
003A 3461            CALL    BSYCNT          ;LOOP UNTIL LINE CURRENT OFF OR TOO MUCH BUSY
003C BA0A            MOV     R2,#0AH         ;COUNT OF 40MS DELAYS
003E 3482    WFHUP2  CALL    DLY40
0040 5638            JLCD    WFHUP           ;RESUME WAIT IF LINE CURRENT IS BACK ON
0042 EA3E            DJNZ    R2,WFHUP2
0044 04E3            JMP     WFEOS2          ;RELEASE SHAFT AND RESTORE TO IDLE

ELECTRONIC SELECTOR SWITCH
DIAL PULSE DETECTION

;A BREAK IN LINE CURRENT CAUSED THE PROGRAM TO ENTER THIS AREA.  IF IT WAS
             ;AN ERROR (VERY SHORT BREAK) THE PROGRAM WILL RESUME THE 34 SECOND COUNTDOWN
             ;WHERE IT LEFT OFF AT WFBRK.

0046         SOBRK   EQU     $                       ;START OF DIAL PULSE BREAK
0046 42              MOV     A,T
0047 A9              MOV     R1,A                    ;SAVE POSITION OF 34 SECOND COUNT
0048 3492            CALL    DLY5                    ;SKIP PAST ANY BOUNCE
004A 34A5            CALL    TIM5                    ;BREAK MUST LAST ANOTHER 5MS UNINTERRUPTED
004C 1655    BLOOP   JTIME   BRKIN           ;       THE BREAK PASSED THE TIME TEST
004E 464C            JBRK    BLOOP                   ;LOOP UNTIL END OF TIME TEST OR LCD ON

;  RESTORE 34 SECOND COUNTER IF THE BREAK IS TOO SHORT

0050 F9              MOV     A,R1
0051 349F            CALL    TIMR                    ;START CLOCK
0053 0422            JMP     WFBRK

;PROGRAM EXICUTION CONTINUES HERE ONCE THE BREAK HAS PASSED THE TIME TEST.
             ;IF THE SWITCH IS A DIGIT ABSORBING TYPE THE C RELAY IS MOVED TO THE BUSY
             ;POSITION WHICH REMOVES DIAL TONE (BUSY TONE IS INHIBITED BY THE OPEN CAM
             ;SPRING CONTACTS).  NON-ABSORBING TYPES LEAVE THE DIAL TONE CONNECTED UNTIL
             ;THE F RELAY CLOSES OR UNTIL A ROTATE TO THE ELEVENTH POSITION.

0055         BRKIN   EQU     $
0055 7659            JNAB    BRKIN1          ;SKIP C RELAY OPERATION IF NON-ABSORB
0057 99F7            ANL     P1,#NOT CRLY    ;OPERATE C RELAY (TO BUSY POSITION)
0059 B81F    BRKIN1  MOV     R0,#01FH        ;INITIALIZE THE LEVEL COUNTER

;THE SWITCH CLIMBS 1 VERTICAL LEVEL FOR EACH BREAK DETECTED WHICH IS LONGER
             ;THAN 10 MS.

005B         STVERT  EQU     $               ;START VERTICAL PULSE
005B 18              INC     R0              ;POINT AT CURRENT LEVEL
005C 343E            CALL    VERT            ;ONE VERTICAL CLIMB

;THE SWITCH HAS MOVED UP ONE LEVEL AND IS WAITING FOR THE END OF THE CURRENT
             ;BREAK WHICH CAUSED THE CLIMB.  IF THE BREAK LASTS TOO LONG THE SWITCH WILL
             ;RESET SINCE A LONG BREAK MEANS THAT THE CALLER HUNG UP.

005E BCFF            MOV     R4,#0FFH        ;SET UP COUNTER FOR ABNORMAL BREAK LENGTH
0060 BB30            MOV     R3,#030H

0062         WFEOB   EQU     $
0062 566A            JMAK    EOB             ;LCD BACK...FOUND END OF BREAK?
0064 EC62            DJNZ    R4,WFEOB
0066 EB62            DJNZ    R3,WFEOB
0068 04E3            JMP     WFEOS2          ;       BREAK TOO LONG, RESET THE SWITCH
```

```
                ;EXECUTION CONTINUES HERE AS SOON AS THE END OF BREAK IS DETECTED. THE
                ;LINE CURRENT MUST LAST AT LEAST 5 MS TO BE COUNTED AS A VALID MAKE.  IF
                ;THE MAKE IS INVALID THE PROGRAM RETURNS TO WFEOB.  A LONG MAKE IS COUNTED
                ;AS THE END OF THE PULSE TRAIN.  REG 6 & 7 COUNT MAKE LENGTH.

006A            EOB     EQU     $
006A 4662               JBRK    WFEOB           ;       INVALID MAKE DETECTED

006C BF20               MOV     R7,#020H        ;MAKE LENGTH COUNTER
006E BEFF               MOV     R6,#0FFH        ;MAKE LENGTH COUNTER
0070            WFNBRK  EQU     $               ;WAIT FOR NEXT BREAK TO START
0070 4678               JBRK    SONBRK
0072 EE70               DJNZ    R6,WFNBRK       ;COUNT MAKE LENGTH
0074 EF70               DJNZ    R7,WFNBRK       ;COUNT MAKE LENGTH
0076 0482               JMP     LONGMAK

; A BREAK IS DETECTED AND MIGHT BE THE NEXT PULSE. IT MUST BE VALIDATED.

0078            SONBRK  EQU     $               ;VALIDATE POSSIBLE NEXT BREAK
0078 3492               CALL    DLY5
007A 34A5               CALL    TIM5
007C 165B       NBLOOP  JTIME   STVERT          ;   DO NEXT VERTICAL IF VALID BREAK
007E 467C               JBRK    NBLOOP          ; CONTINUE TO VALIDATE NEXT BREAK
0080 0470               JMP     WFNBRK          ;       INVALID NEXT BREAK

ELECTRONIC SELECTOR SWITCH
LEVEL DECISIONS

;THE VERTICAL MAGNET HAS BEEN PULSED TO THE PROPER LEVEL.  NON-ABSORBING
                ;SELECTORS SKIP OVER THE ABSORBTION AREA AND GO DIRECTLY TO THE CUT IN
                ;ROUTINE.  SELECTORS WHICH ABSORB SOME DIGITS MUST DECIDE WHAT TO DO NEXT
                ;DEPENDING ON WHICH LEVEL THE SWITCH IS AT.

0082            LONGMAK EQU     $               ;END OF PULSE TRAIN
0082 8686               JNI     LM1             ;IF PIN 6 IS LOW CHECK OPTIONS [5/8/84 MES]
0084 04AC               JMP     BLOCK           ;IF PIN 6 IS HIGH RESTRICT ACCESS [5/8/84 MES]
0086 76B4       LM1     JNAB    CUTIN           ;TEST NON ABSORB FLAG.
0088 08                 INS     A,BUS           ;GET BUS TO TEST DA LEAD
0089 12B4               JDA     CUTIN           ;CUT IN IF DA LEAD ACTIVE

;CHECK FOR MARKINGS ON THE CURRENT LEVEL
                ;POSSIBLE MARKINGS ARE:
                ;       AO = ABSORB ONCE
                ;       AR = ABSORB REPEATEDLY
                ;       BL = BLOCKED LEVEL
                ;       CIAR = CUT IN/ABSORB REPEATEDLY
                ;       CIAO = CUT IN/ABSORB ONCE
                ;       ARAO = ABSORB REPEATEDLY/ABSORB ONCE

008B F0                 MOV     A,@R0           ;GET MARKINGS FOR CURRENT LEVEL
008C 32A0               JAO     ABSORB          ;ABSORB ONCE
008E 52A8               JAR     ABSORBR         ;ABSORB REPEATEDLY
0090 B698               JFAB    OPT2            ;IF SET, GO TO SECOND OF DUAL MARKING

;THESE ARE THE FIRST OPTIONS FOR DUAL MARKED LEVELS

0092 D2A8               JARAO   ABSORBR         ;ABSORB REPEATEDLY
0094 72AC               JBL     BLOCK           ;BLOCKED LEVEL
0096 04B4               JMP     CUTIN           ;DEFAULT TO CUTIN

;THESE ARE THE SECOND OPTIONS OF DUAL MARKED LEVELES

0098            OPT2    EQU     $
0098 92A8               JCIAR   ABSORBR         ;ABSORB REPEATEDLY
009A B2A0               JCIAO   ABSORB          ;ABSORB ONCE
009C D2A0               JARAO   ABSORB
009E 04B4               JMP     CUTIN           ;DEFAULT TO CUTIN
```

ELECTRONIC SELECTOR SWITCH
LEVEL OPERATIONS

```
                    ;THESE ROUTINES ARE ENTERED AFTER THE MARKING FOR A LEVEL HAS BEEN CHECKED
                    ;OR AFTER FINDING THE NON ABSORB FLAG SET. ONE OF FOUR FUNCTIONS WILL BE
                    ;COMPLEATED IN THIS AREA. THE FUNCTIONS ARE ABSORB A DIGIT AND SET THE
                    ;NON-ABSORB FLAG (ABSORB ONCE), ABSORB THE DIGIT AND SET THE FIRST ABSORB
                    ;FLAG (ABSORB REPEATEDLY), ROTATE TO THE BUSY POSITION WITH OUT ATTEMPTING
                    ;A CUTIN (BLOCKED LEVEL), TEST C LEADS UNTIL AN OPEN C LEAD IS DETECTED
                    ;AND CLOSE THE F RELAY OR IF NO OPEN C LEAD IS DETECTED STOP AT THE ELEVENTH
                    ;POSITION AND APPLY THE BUSY TONE (CUTIN).

00A0        ABSORB  EQU     $           ;ABSORB THE DIGIT SET NON ABSORB FLAG
00A0 A5             CLR     F1
00A1 B5             CPL     F1          ;END ABSORBING
00A2 3480   ABSORB1 CALL    DLY50       ;WAIT FOR SWITCH TO SETTLE
00A4 342A           CALL    REL         ;DROP THE SHAFT
00A6 041B           JMP     SETCNT      ;GET ANOTHER DIGIT BEFORE 34 SECONDS

00A8        ABSORBR EQU     $           ;ABSORB THE DIGIT AND SWITCH TO SECOND MARKINGS
00A8 85             CLR     F0
00A9 95             CPL     F0          ;SET THE FIRST ABSORB FINISHED FLAG
00AA 04A2           JMP     ABSORB1

00AC        BLOCK   EQU     $           ;ROTATE TO BUSY ON BLOCKED LEVEL
00AC BA0B           MOV     R2,#0BH     ;NUMBER OF ROTATES TO BUSY
00AE 3433   BLOCK1  CALL    HORZ        ;DO ONE ROTATE
00B0 EAAE           DJNZ    R2,BLOCK1   ;LOOP TIL ROTATE TO BUSY
00B2 0438           JMP     WFHUP       ;LOOP AT WFHUP UNTIL LOSS OF LOOP CURRENT

;THIS IS THE CUT IN ROUTINE, IT CHECKS FOR AN OPEN TRUNK FORWARD AND
                    ;ATTEMPTS TO CUT THE CALL AHEAD TO THE NEXT VACENT SWITCH. IF NONE IS
                    ;FOUND THE CALL IS ENDED IN THE BUSY POSITION OF THE SWITCH. SUCCESSFUL
                    ;CUT THROUGHS WIND UP IN A LOOP WAITING FOR A LOSS OF THE C LEAD SIGNAL.

00B4        CUTIN   EQU     $
00B4 BA0B           MOV     R2,#0BH     ;MAX NUMBER OF ROTATES
00B6 3433   CUTIN1  CALL    HORZ        ;DO ONE ROTATE
00B8 EABC           DJNZ    R2,CUTIN2   ;CONTINUE IF NOT AT POSITION ELEVEN
00BA 0438           JMP     WFHUP       ;DEFALT TO BUSY IF AT ELEVENTH POSITION
00BC 36B6   CUTIN2  JGCL    CUTIN1      ;BUSY C LEAD HERE, GO TO NEXT POSITION
00BE 34A9           CALL    TIM10       ;START 10 MS TIMER
00C0 16C6   CUTIN3  JTIME   CUTIN4      ;OPEN C IS VALID, CLOSE F RELAY
00C2 26C0           JOCL    CUTIN3      ;CONTINUE TO TEST C LEAD FOR OPEN
00C4 04B6           JMP     CUTIN1      ;GROUND APPEARED BEFORE TIME OUT, IT'S BUSY

;THE SWITCH IS PARKED ON AN OPEN C LEAD. NOW THE F RELAY WILL BE CLOSED
                    ;THROWING LOOP CURRENT FORWARD TO THE NEXT SWITCH. THE NEXT SWITCH MUST
                    ;ANSWER WITH A GROUNDED C LEAD. IF THE NEXT SWITCH ANSWERS THE PROGRAM
                    ;LOOPS UNTIL THE C LEAD OPENS AGAIN. IF NO GROUND IS SENT FROM THE NEXT
                    ;SWITCH THIS SWITCH MOVES TO THE BUSY POSITION UNTIL A LOSS OF LOOP CURRENT
                    ;IS DETECTED.

00C6 65     CUTIN4  STOP    TCNT
00C7 997F           ANL     P1,#NOT FRLY ;ENERGIZE THE F RELAY
00C9 3470           CALL    DLY275      ;WAIT FOR NEXT SWITCH (MAY BE MECHINICAL)
00CB 9A7F           ANL     P2,#NOT SUPY ;RELEASE THIS SWITCH GROUND ON C
00CD 349A           CALL    DLY1        ;     03/07/84 M.E.S.

;IF THERE IS GROUND ON THE C LEAD HERE IT IS COMMING FROM THE NEXT SWITCH
                    ;BECAUSE THIS SWITCH HAS RELEASED ITS GROUND.

00CF 36D7           JGCL    WFEOS       ;CALL IS CUT THROUGH TO NEXT SWITCH

;IF THERE IS NO GROUND THEN WE MUST RE-SUPLY GROUND FROM THIS SWITCH,
                    ;GIVE THE CALLER A BUSY TONE AND WAIT FOR THE CALLER TO HANF UP THE PHONE

00D1 8A80           ORL     P2,#SUPY    ;RESTORE GROUND TO HOLD TRAIN
00D3 8980           ORL     P1,#FRLY    ;OPEN THE F RELAY AGAIN
00D5 04AE           JMP     BLOCK1      ;GO TO BUSY
```

ELECTRONIC SELECTOR SWITCH
CALL IN PROGRESS IDLE LOOP

```
                        ;HERE IT IS... THE OBJECT OF ALL THIS DIALING IS TO GET HERE.  THIS IS
                        ;LOOP WHICH MAY BE EXITED BY RESET OR BY AN OPEN C LEAD THAT LASTS LONGER
                        ;THAN 34 MS IN EITHER CASE THE PROGRAM HEADS BACK TO RESET WHEN IT LEAVES
                        ;HERE

00D7        WFEOS   EQU     $               ;WAIT FOR END OF SELECT
00D7 36D7           JGCL    WFEOS           ;LOOP TIL OPEN C
00D9 56D7           JLCD    WFEOS           ;IF "BH" SEEN
00DB 34AD           CALL    TIM34           ;OPEN C MUST LAST AT LEAST 34 MS
00DD 16E3   WFEOS1  JTIME   WFEOS2
00DF 36D7           JGCL    WFEOS           ;REENTER LOOP IF GROUND RETURNS
00E1 04DD           JMP     WFEOS1          ;CONTINUE TESTING
00E3 65     WFEOS2  STOP    TCNT
00E4 8A88           ORL     P2,#SUPY+CRLY   ;GROUND C LEAD TO PREVENT SIEZE DURING REL
00E6 342A           CALL    REL             ;DROP THE SHAFT
00E8 3478           CALL    DLY500
00EA 344B           CALL    VONCK           ;SEE IF THE SHAFT FELL
00EC 0400           JMP     RESET           ;END OF CALL
```

ELECTRONIC SELECTOR SWITCH
SUBROUTINES

```
                        ;IF THE SWITCH IS A DIGIT ABSORBING SELECTOR THE JUMPER FIELD IS SCANNED
                        ;TO MAKE A DIGIT ABSORBING TABLE AT THIS POINT.  THE TABLE IS BUILT FOR EACH
                        ;CALL PROCESSED BY THE SWITCH.

00EE B829   TABLE   MOV     R0,#029H        ;REG 0 POINTS AT THE END OF THE TABLE
00F0 0A             IN      A,P2            ;GET P2 BYTE INTO THE ACC
00F1 A9             MOV     R1,A            ;SAVE FOR LATER USE TO RESTORE P2

00F2 53FE   STB0    ANL     A,#0FEH         ;CHECK LEVEL 0 (TOP LEVEL)
00F4 341F           CALL    MARK2
00F6 53FD   STB9    ANL     A,#0FDH         ;CHECK LEVEL 9
00F8 341F           CALL    MARK2
00FA 53FB   STB8    ANL     A,#0FBH         ;CHECK LEVEL 8
00FC 341F           CALL    MARK2
00FE 53F7   STB7    ANL     A,#0F7H         ;CHECK LEVEL 7
0100 341F           CALL    MARK2
0102 53EF   STB6    ANL     A,#0EFH         ;CHECK LEVEL 6
0104 341F           CALL    MARK2
0106 53DF   STB5    ANL     A,#0DFH         ;CHECK LEVEL 5
0108 341F           CALL    MARK2
010A 53BF   STB4    ANL     A,#0BFH         ;CHECK LEVEL 4
010C 341F           CALL    MARK2
010E 3A             OUTL    P2,A            ;RESTORE PORT TWO 010F 09             IN      A,P1            ;CHECK DIGITS ON P1
0110 A9             MOV     R1,A            ;SAVE FOR LATER RESTORE OF P1

0111 53FE   STB3    ANL     A,#0FEH         ;CHECK LEVEL 3
0113 3427           CALL    MARK1
0115 53FD   STB2    ANL     A,#0FDH         ;CHECK LEVEL 2
0117 3427           CALL    MARK1
0119 53FB   STB1    ANL     A,#0FBH         ;CHECK LEVEL 1 (BOTTOM LEVEL)
011B 3427           CALL    MARK1
011D 39             OUTL    P1,A            ;RESTORE PORT ONE
011E 93             RETR

011F        MARK2   EQU     $               ;MARK DIGITS ON PORT 2
011F 3A             OUTL    P2,A            ;STROBE THE PORT TWO DIGIT
0120 00     MARK    NOP
0121 08             INS     A,BUS           ;READ ANY MARKING FOR THE LEVEL
0122 37             CPL     A
0123 A0             MOV     @R0,A           ;STORE THE INVERTED MARKING
0124 C8             DEC     R0              ;POINT TO NEXT TABLE ENTRY
0125 F9             MOV     A,R1
0126 83             RET

0127        MARK1   EQU     $               ;MARK DIGITS ON PORT ONE
0127 39             OUTL    P1,A
0128 2420           JMP     MARK
```

```
                    ;THESE ARE THE THREE MOTIONS THAT THE SWITCH CAN DO

012A        REL     EQU     $           ;OPERATE THE RELEASE MAGNET
012A 99EF           ANL     P1,#NOT RLSM   ;ENERGIZE THE COIL
012C 3482           CALL    DLY40          ;FOR 40 MS
012E 8910           ORL     P1,#RLSM       ;DE-ENERGIZE THE COIL
0130 3484           CALL    DLY30          ;FOR 30 MS
0132 93             RETR

0133        HORZ    EQU     $           ;OPERATE THE ROTARY MAGNET
0133 99DF           ANL     P1,#NOT RMAG   ;ENERGIZE THE COIL
0135 3486           CALL    DLY20          ;FOR 20 MS
0137 8920           ORL     P1,#RMAG       ;DE-ENERGIZE THE COIL
0139 3488           CALL    DLY10
013B 3496           CALL    DLY3           ;FOR 13 MS
013D 93             RETR

013E        VERT    EQU     $           ;OPERATE THE VERTICAL MAGNET
013E 99BF           ANL     P1,#NOT VMAG   ;ENERGIZE THE COIL
0140 3484           CALL    DLY30
0142 3490           CALL    DLY6           ;FOR 36 MS
0144 8940           ORL     P1,#VMAG       ;DE-ENERGIZE THE COIL
0146 3488           CALL    DLY10
0148 348A           CALL    DLY9           ;FOR 19 MS
014A 93             RETR
```

ELECTRONIC SELECTOR SWITCH
SUBROUTINES

```
                    ;This routine checks the condition of the vertical off normal contacts
                    ;and attempts to un-stick a stuck switch twice before returning. The
                    ;program is stuck here if the switch remains stuck.
014B        VONCK   EQU     $
014B 08             INS     A,BUS          ;GET THE BUS BYTE
014C F24F           JVON    VONCK1         ;NO RETURN IF OFF NORMAL
014E 93             RETR
014F 8A80   VONCK1  ORL     P2,#SUPY       ;THIS SWITCH REMAINS BUSY TIL UNSTUCK
0151 342A           CALL    REL
0153 3478           CALL    DLY500
0155 08             INS     A,BUS          ;LOOK AT BUS AGAIN
0156 F259           JVON    VONCK2
0158 93             RETR
0159 342A   VONCK2  CALL    REL            ;LAST CHANCE...
015B 3478           CALL    DLY500
015D 08     VONCK3  INS     A,BUS
015E F25D           JVON    VONCK3
0160 93             RETR ;THIS ROUTINE COUNTS THE LENGTH OF TIME THAT SOMEONE LISTENS TO THE BUSY
                    ;TONE.  THE "C" LEAD IS OPENED FOR 500 MS IF LONGER THAN 30 SEC.
0161        BSYCNT  EQU     $
0161 BB96           MOV     R3,#150        ;NUMBER OF LOOPS
0163 466F   BSYCNT1 JNLCD   BSYXIT
0165 347C           CALL    DLY200
0167 EB63           DJNZ    R3,BSYCNT1
0169 9A7F           ANL     P2,#NOT SUPY   ;OPEN THE "C" LEAD
016B 3478           CALL    DLY500         ;FOR 500MS
016D 8A80           ORL     P2,#SUPY
016F 93     BSYXIT  RETR
```

ELECTRONIC SELECTOR SWITCH
SUBROUTINES

```
                    ;DELAY ROUTINES 0170 347C   DLY275  CALL    DLY200
0172 3480   DLY75   CALL    DLY50
0174 3486   DLY25   CALL    DLY20
0176 2492           JMP     DLY5
0178 347E   DLY500  CALL    DLY100
017A 347C   DLY400  CALL    DLY200
017C 347E   DLY200  CALL    DLY100
017E 3480   DLY100  CALL    DLY50
0180 3488   DLY50   CALL    DLY10
0182 3488   DLY40   CALL    DLY10
```

```
0184 3488    DLY30   CALL    DLY10
0186 3488    DLY20   CALL    DLY10
0188 349A    DLY10   CALL    DLY1
018A 349A    DLY9    CALL    DLY1
018C 349A    DLY8    CALL    DLY1
018E 349A    DLY7    CALL    DLY1
0190 349A    DLY6    CALL    DLY1
0192 349A    DLY5    CALL    DLY1
0194 349A    DLY4    CALL    DLY1
0196 349A    DLY3    CALL    DLY1
0198 349A    DLY2    CALL    DLY1
019A BD77    DLY1    MOV     R5,#077H
019C ED9C    LOOP    DJNZ    R5,LOOP
019E 93              RETR

;TIMER ROUTINES ARE USED TO STARE AT A SIGNAL FOR A GIVEN LENGTH OF TIME 019F 65      TIMR    STOP    TCNT
01A0 16A2            JTIME   TIMR1       ;RESET THE FLAG IF IT IS ALREADY SET
01A2 62      TIMR1   MOV     T,A         ;SET VALUE
01A3 55              STRT    T
01A4 93              RETR

01A5         TIM5    EQU     $           ;5MS STARE
01A5 23D0            MOV     A,#0D0H
01A7 249F            JMP     TIMR

01A9         TIM10   EQU     $           ;10 MS STARE
01A9 23B4            MOV     A,#0B4H
01AB 249F            JMP     TIMR

01AD         TIM34   EQU     $           ;34 MS STARE
01AD 2300            MOV     A,#0
01AF 249F            JMP     TIMR

ELECTRONIC SELECTOR SWITCH
SUBROUTINES

01B1                 IF      AUTOCLN
             ;AUTO CLEAN ROUTINE
             ;     THIS ROUTINE USES REGISTER BANK 1 TO TIME OUT AT 19 HOURS OF IDLE
             ;TIME AND FORCE THE SWITCH TO BRUSH EACH OF THE CONTACTS.  THIS CODE
             ;IS NOT USED IF AUTOCLN IS FALSE.

01B1         LONGCNT EQU     $
01B1                 SEL     RB1
01B1                 NOP
01B1                 DJNZ    R3,LONGCNT
01B1                 DJNZ    R4,LONGCNT
01B1                 DJNZ    R5,LONGCNT
01B1                 DJNZ    R6,LONGCNT

01B1         CLEAN   EQU     $           ;BRUSH ALL THE CONTACTS
01B1                 SEL     RB1
01B1                 ORL     P2,#SUPY    ;MAKE THE SWITCH BUSY
01B1                 MOV     R0,#0AH     ;LEVEL COUNTER
01B1         CLEAN1  MOV     A,R0
01B1                 MOV     R1,A
01B1         CLEAN2  CALL    VERT        ;CLIMB TO LEVEL
01B1                 CALL    DLY10
01B1                 DJNZ    R1,CLEAN2
01B1                 MOV     R1,#0BH     ;POSITION COUNTER
01B1         CLEAN3  CALL    HORZ        ;ROTATE ACROSS EACH POSITION
01B1                 DJNZ    R1,CLEAN3
01B1                 CALL    REL
01B1                 CALL    DLY500
01B1                 DJNZ    R0,CLEAN1   ;DO ANOTHER LEVEL
01B1                 JMP     RESET
01B1                 ENDIF
```

ELECTRONIC SELECTOR SWITCH
SUBROUTINES

```
01B1 434F5059      DB      'COPYRIGHT (C) 1983 CONWAY ENGINEERING INC.'
01DB 36373520      DB      '675 HEGENBERGER RD'
01ED 4F414B4C      DB      'OAKLAND, CA'
0000               END
```

ELECTRONIC CONNECTOR SWITCH
April 26, 1984

```
                ;EC 0.07
                ;THIS VERSION SUPPORTS:
                ;               TRUNK & LEVEL CONNECTORS

;04/26/84 - MES         - EC 0.07 -
                ;       Added instructions to load the vertical and horizontal registers at
                ;       power on for use with "PUPS".
                ;
                ;04/18/84 - MES         - EC 0.06 -
                ;       Allow up to 1 sec of line current loss from either party while
                ;       call is in progress before dumping the line.
                ;
                ;04/12/84 - MES         - EC 0.05 -
                ;       Added code to check for false trips. If no called party restart
                ;       ringing.
                ;
                ;04/12/84 - MES         - EC 0.04 -
                ;       Added routines to verify a change in the ring pulses so that
                ;       the connector does not trip on the transisition from ring to
                ;       silent period. The new routine looks for two pulses that are
                ;       different from the reference instead of one.
                ;
                ;04/11/84 - MES         - EC 0.03 -
                ;       Inverted bit for ring trip. PIN 6 is LOW when the phone is on
                ;       hook and not ringing. PIN 6 is HIGH if the phone is off hook during
                ;       the silent period of the ring cycle. JACT changed to JIBL.
                ;
                ;03/19/84 - MES         - EC 0.02 -
                ;       Added a delay in the NXTLVL routine to insure no vertical movement
                ;       while the release mechanics are still in operation.
                ;
                ;03/16/84 - MES         - EC 0.01 -
                ;       "C" LEAD inputs are not inverted as in the original selector
                ;       switch. Redefined OPSYN JOCL,J6CL,JOEC,J6EC to invert the
                ;       bits at pins 1 & 23.
                ;
                ;03/10/84 - MES         - EC 0.00 -
                ;       ES 1.01 BY MARK STAMOS FOR CONWAY ENGINEERING INC.
```

ELECTRONIC CONNECTOR SWITCH
EQUATES & DEFINITIONS

```
0000            FALSE   EQU     0
FFFF            TRUE    EQU     NOT FALSE

;ASSEMBLY OPTIONS

;EQUATES
                ;               - REGISTER DEFINITIONS -
                ;                       BANK 0
0A00            REFRNG  EQU     R0      ;HOLDS REFERENCE PULSE FOR RING TRIP
0A01            SECONDS EQU     R1      ;USED DURING 30 SECOND WAIT
0A01            PLSCNT  EQU     R1      ;COUNTS NUMBER OF DIFFERENT RING PULSES
0A02            CLKVAL  EQU     R2      ;  [RESERVED]    FOR TCOUNT RANGE SELECTION
0A03            TCOUNT  EQU     R3      ;  [RESERVED]    FOR TIC COUNTER (00-99)
0A04            VPOS    EQU     R4      ;  [RESERVED]    HOLDS REMAINING VERTICAL LEVELS
0A05            HPOS    EQU     R5      ;  [RESERVED]    HOLDS REMAINING HORIZONTAL POSITIONS
0A06            DELAY   EQU     R6      ;USED DURING DELAYS
0A07            TSTRNG  EQU     R7      ;RING PULSE UNDER TEST

JLCD    OPSYN   JT1     ;JUMP IF LINE CURRENT DETECTED
                JNLCD   OPSYN   JNT1    ;JUMP IF NO LINE CURRENT DETECTED
                JNDLCD  OPSYN   JZ      ;JMP IF "D" PARTY LINE CURRENT IS ZERO
```

```
          JDLCD    OPSYN    JB1      ;JMP IF "D" PARTY LINE CURRENT IS DETECTED
          JMAK     OPSYN    JT1      ;JUMP IF MAK (DIAL PULSE)
          JBRK     OPSYN    JNT1     ;JUMP IF BREAK (DIAL PULSE)
          JGCL     OPSYN    JNT0     ;JUMP IF C LEAD IS BUSY (GROUNDED)        MES 3/16/84
          JOCL     OPSYN    JT0      ;JUMP IF C LEAD IS NOT GROUNDED           MES 3/16/84
          JOEC     OPSYN    JNZ      ;JMP IF EC IS NOT GROUNDED                MES 3/16/84
          JGEC     OPSYN    JZ       ;JUMP IF EC IS GROUNDED                   MES 3/16/84
          JNPU     OPSYN    JZ
          JPU      OPSYN    JNZ      ;JUMP IF PU IS 1
          JFAB     OPSYN    JF0      ;JUMP IF DONE FIRST ABSORB
          JNAB     OPSYN    JF1      ;JUMP IF NON-ABSORB FLAG IS SET
          JTIME    OPSYN    JTF      ;JUMP ON TIMER FLAG
          JZ1      OPSYN    JNZ      ;JUMP IF Z OPTION = 1
          JIDL     OPSYN    JNI      ;JUMP IF RING PULSE IS IDLE      #4/11/84 MES

;INPUT BITS AND MASKS
0008      PU       EQU      00001000B    ;PU LEAD BIT
0004      ECIN     EQU      00000100B    ;EC LEAD BIT
0002      DLCD     EQU      00000010B    ;"D" PARTY LOOP CURRENT
0002      ZOPT     EQU      00000010B    ;"Z" OPTION BIT

;OUTPUT CONTROL BITS
0002      RGRB     EQU      00000010B    ;RING GEN/RING BACK      (P1) [CONNECTOR]
0004      VHHD     EQU      00000100B    ;VERTICAL HOLD MAGNET    (P1) [CONNECTOR]
0008      CRLY     EQU      00001000B    ;C RELAY CONTROL BIT     (P1) [SELECTOR]
0008      BTRY     EQU      00001000B    ;BUSY TONE RELAY         (P1) [CONNECTOR]
0010      RLSM     EQU      00010000B    ;RELEASE MAGNET          (P1)
0020      RMAG     EQU      00100000B    ;ROTARY MAGNET           (P1)
0020      CWOT     EQU      00100000B    ;C WIPER OUT             (P2) [CONNECTOR]
0040      VMAG     EQU      01000000B    ;VERTICAL MAGNET         (P1)
0040      ECOT     EQU      01000000B    ;SEL. RING. EC OUT       (P2) [CONNECTOR]
0080      FRLY     EQU      10000000B    ;F RELAY                 (P1)
0080      SUPY     EQU      10000000B    ;SUPY LEAD               (P2) [SELECTOR]
0080      COUT     EQU      10000000B    ;HOLDS UP TRAIN WHEN 0   (P2) [CONNECTOR]

ELECTRONIC CONNECTOR SWITCH
TIC COUNTER

0000               ORG      0
0000 0417          JMP      RESET        ;JUMP PAST THE TIC COUNTER

0007               ORG      7
                   ;THE TIMER CAUSES AN INTERRUPT TO THIS LOCATION EACH TIME THAT IT OVERFLOWS.
                   ;THE TIC ROUTINE COUNTS THE NUMBER OF OVERFLOWS IN THE TCOUNT REGISTER.
                   ;THE VALUES BELOW SET THE TIME BETWEEN INTERRUPTS.  THE VALUE IS LOADED INTO
                   ;THE CLKVAL REGISTER TO SET THE TIME AT THE NEXT INTERRUPT.

00F9      CV1MS    EQU      0F9H         ;SETS TIC COUNTER TO 1mS PER TIC
00B5      CV10MS   EQU      0B5H         ;SETS TIC COUNTER TO 10mS PER TIC

0007      TIC      EQU      $
0007 65            STOP     TCNT         ;STOP THE CLOCK
0008 2B            XCH      A,TCOUNT     ;PRESERVE THE ACCUMULATOR
0009 0301          ADD      A,#1         ;ADD A TIC TO THE COUNT NOW IN THE ACCUMUALTOR
000B 57            DA       A            ;THE TIC COUNTER IS BCD
000C 2B            XCH      A,TCOUNT     ;
000D 2A            XCH      A,CLKVAL     ;GET CLOCK VALUE FOR 1 TIC
000E 62            MOV      T,A          ;SET THE CLOCK
000F 2A            XCH      A,CLKVAL     ;RESTORE ACCUMULATOR
0010 25            EN       TCNTI
0011 00            NOP
0012 00            NOP                   ;4 NOP = 16uS @ 3.57 MHZ CLOCK
0013 00            NOP
0014 00            NOP
0015 55            STRT     T            ;RUN THE CLOCK
0016 93            RETR

ELECTRONIC CONNECTOR SWITCH
RESET AND START UP

;THE PROGRAM STARTS HERE AT THE OCCURENCE OF A HARDWARE RESET WHEN THE
                   ;SWITCH IS SIEZED AND JUMPS HERE WHEN THE SWITCH IS RELEASED.  IN ORDER
                   ;FOR THE PROGRAM TO PASS THE LOCK ROUTINE LINE CURRENT MUST BE DETECTED
                   ;FOLLOWING A RESET.  ONCE THE SWITCH ENTERS THE LOCK ROUTINE IT REMAINES
                   ;CAUGHT IN THE LOOP UNTIL A RESET OCCURES.
```

```
0017            RESET   EQU     $               ;EVERYTHING STARTS HERE
0017 23FF               MOV     A,#0FFH         ;INITIAL VALUE FOR PORT 1
0019 39                 OUTL    P1,A
001A C5                 SEL     RB0
001B BC0A               MOV     VPOS,#10        ;SET THE COUNTER TO TEN REMAINING POSITIONS
001D BD0A               MOV     HPOS,#10        ;SET THE COUNTER TO TEN REMAINING LEVELS
001F BAB5               MOV     CLKVAL,#CV10MS  ;SET TIC COUNTER TO 10 MILLISECONDS
0021 85                 CLR     F0
0022 A5                 CLR     F1
0023 1407               CALL    TIC             ;START THE CLOCK
0025 562C       RESET1  JLCD    INUSE           ;BEGIN A CALL IF LINE CURRENT IS ON

0027            LOCK    EQU     $
0027 237F               MOV     A,#07FH         ;INITIAL VALUE FOR PORT 2
0029 3A                 OUTL    P2,A
002A            LOCK1   EQU     $
002A 042A               JMP     LOCK1

ELECTRONIC CONNECTOR SWITCH
WAITING FOR START OF PULSE TRAIN

;IF THE PROGRAM ENTERS THIS AREA IT MEANS THAT LINE CURRENT WAS DETECTED
                        ;AT RESET1. THIS SWITCH IS NOW RESPONSIBLE FOR HOLDING UP THE C LEAD
                        ;AND MUST SIGNAL ALL OTHER SWITCHES THAT IT IS IN USE.

002C            INUSE   EQU     $
002C 8A80               ORL     P2,#SUPY        ;GROUND SUPY & C LEADS OF PREVIOUS SWITCHES

;THIS SWITCH WILL WAIT UP TO 34 SECONDS FOR A DIGIT TO BE DIALED, OR RESET
                        ;ITSELF IF THE CALLER HANGS UP THE PHONE (LINE CURRENT IS REMOVED).

002E            SETCNT  EQU     $               ;SET UP 34 SECOND TIMER
002E BAB5               MOV     CLKVAL,#CV10MS  ;SET TO SLOW CLOCK (10 MS/TIC)
0030 B91E               MOV     SECONDS,#30     ;ALLOW 30 SECONDS
0032 BB01       WFBRK1  MOV     TCOUNT,#1       ;BUMP COUNTER OFF ZERO
0034            WFBRK   EQU     $               ;LOOP HERE WAITING FOR BREAK
0034 464A               JBRK    SOBRK           ;      MOVE TO START OF BREAK AREA
0036 FB                 MOV     A,TCOUNT        ;CHECK THE TIC COUNTER
0037 9634               JNZ     WFBRK
0039 E932               DJNZ    SECONDS,WFBRK1  ;TIME IS NOT UP YET

;IF NO BREAKS ARE DETECTED WITHIN 30 SECONDS THE SWITCH TIMES OUT BY
                        ;CLOSING THE BUSY TONE RELAY AND WAITING FOR A LOSS OF LOOP CURRENT.

003B            TIMOUT  EQU     $
003B 99F7               ANL     P1,#NOT CRLY    ;ENERGIZE C RELAY (BUSY POSITION)

;                       THE PROGRAM LOOPS HERE UNTIL THE CALLER
                        ;HANGS UP. A HANGUP IS DETECTED BY THE LOSS OF LINE CURRENT SINCE THE
                        ;C LEAD HAS NOT YET BEEN GROUNDED BY A NEXT SWITCH. A LOSS OF LINE
                        ;CURRENT LESS THAN 400 MS IS IGNORED.

003D            WFHUP   EQU     $
003D 99F7               ANL     P1,#NOT CRLY    ;ENERGIZE C RELAY IF NOT ALREADY (BUSY)
003F 563F       WFHUP1  JLCD    WFHUP1          ;LOOP UNTIL LINE CURRENT OFF
0041 BB60               MOV     TCOUNT,#60H     ;40,10MS TICS AWAY FROM OVERFLOW
0043 563F       WFHUP2  JLCD    WFHUP1
0045 FB                 MOV     A,TCOUNT        ;CHECK FOR TIC OVER FLOW
0046 9643               JNZ     WFHUP2
0048 249A       TOEOC   JMP     EOC             ;RELEASE SHAFT AND RESTORE TO IDLE

;A BREAK IN LINE CURRENT CAUSED THE PROGRAM TO ENTER THIS AREA. IF IT WAS
                        ;AN ERROR (VERY SHORT BREAK) THE PROGRAM WILL RESUME THE 34 SECOND COUNTDOWN
                        ;WHERE IT LEFT OFF AT WFBRK.

004A            SOBRK   EQU     $               ;START OF DIAL PULSE BREAK
004A 34FE               CALL    DLY5            ;SKIP PAST ANY BOUNCE
004C BAF9               MOV     CLKVAL,#CV1MS   ;SET FOR FAST CLOCK
004E 1407               CALL    TIC             ;DO IT NOW
0050 BB95               MOV     TCOUNT,#95H     ;5MS AWAY FORM OVERFLOW
0052 FB         BLOOP   MOV     A,TCOUNT        ;TEST FOR OVER FLOW
0053 C65B               JZ      BRKIN           ;      THE BREAK PASSED THE TIME TEST
0055 4652               JBRK    BLOOP           ;LOOP UNTIL END OF TIME TEST OR LCD ON
```

; RESTORE 34 SECOND COUNTER IF THE BREAK IS TOO SHORT

```
0057 BAB5            MOV     CLKVAL,#CV10MS  ;BACK TO SLOW COUNT
0059 0434            JMP     WFBRK
```

ELECTRONIC CONNECTOR SWITCH
DIAL PULSE DETECTION

```
                     ;PROGRAM EXICUTION CONTINUES HERE ONCE THE BREAK HAS PASSED THE TIME TEST.
                     ;WE NOW CHECK F1 TO SEE IF WE ROTATE OR CLIMB.  IF FLAG 1 IS SET (1) WE
                     ;ROTATE ONE POSITION FOR EACK BREAK.

005B         BRKIN   EQU     $
005B 7661            JF1     STHORZ

;THE SWITCH CLIMBS 1 VERTICAL LEVEL FOR EACH BREAK DETECTED WHICH IS LONGER
                     ;THAN 10 MS.

005D         STVERT  EQU     $               ;START VERTICAL PULSE
005D 34BE            CALL    VERT            ;ONE VERTICAL CLIMB
005F 0463            JMP     SFEOB

;THE SWITCH ROTATES ONE POSITION FOR EACH BREAK IN LOOP CURRENT

0061         STHORZ  EQU     $
0061 34B2            CALL    HORZ

;THE SWITCH HAS MOVED ONE POSITION AND IS WAITING FOR THE END OF THE CURRENT
                     ;BREAK WHICH CAUSED THE MOVE.  IF THE BREAK LASTS 200 MS  THE SWITCH WILL
                     ;RESET SINCE A LONG BREAK MEANS THAT THE CALLER HUNG UP.

0063 BAB5    SFEOB   MOV     CLKVAL,#CV10MS  ;SET CLOCK TO SLOW SPEED
0065 BB80            MOV     TCOUNT,#80H     ;20,10MS TICS FROM OVERFLOW

0067         WFEOB   EQU     $
0067 566E            JMAK    EOB             ;LCD BACK...FOUND END OF BREAK?
0069 FB              MOV     A,TCOUNT        ;CHECK THE TICKS
006A 9667            JNZ     WFEOB
006C 249A            JMP     EOC             ;      BREAK TOO LONG, RESET THE SWITCH

;EXECUTION CONTINUES HERE AS SOON AS THE END OF BREAK IS DETECTED.  THE
                     ;LINE CURRENT MUST LAST AT LEAST 5 MS TO BE COUNTED AS A VALID MAKE.  IF
                     ;THE MAKE IS INVALID THE PROGRAM RETURNS TO WFEOB.  A LONG MAKE IS COUNTED
                     ;AS THE END OF THE PULSE TRAIN.

006E         EOB     EQU     $
006E BAF9            MOV     CLKVAL,#CV1MS   ;FAST CLOCK
0070 1407            CALL    TIC
0072 BB95            MOV     TCOUNT,#95H     ;5MS AWAY
0074 4663    MAK1    JBRK    SFEOB           ;      INVALID MAKE DETECTED
0076 FB              MOV     A,TCOUNT        ;TAKE A LOOK
0077 9674            JNZ     MAK1

;IF THE PROGRAM GETS HERE THE MAKE LASTED AT LEAST 5MS AND IS COUNTED
                     ;AS VALID.  NOW KEEP WATCHING THE MAKE AND EXIT IF A NEW BREAK STARTS
                     ;OR IF THE MAKE IS LONGER THAN 800MS.

0079 BAB5    MAK2    MOV     CLKVAL,#CV10MS  ;SLOW CLOCK
007B BB75            MOV     TCOUNT,#75H     ;MAKE LENGTH COUNTER
007D         MAK3    EQU     $               ;WAIT FOR NEXT BREAK TO START
007D 4684            JBRK    SONBRK
007F FB              MOV     A,TCOUNT        ;TAKE A LOOK AT THE TIC COUNTER
0080 967D            JNZ     MAK3
0082 0493            JMP     LONGMAK

; A BREAK IS DETECTED AND MIGHT BE THE NEXT PULSE.  IT MUST BE VALIDATED.

0084         SONBRK  EQU     $               ;VALIDATE POSSIBLE NEXT BREAK
0084 34FE            CALL    DLY5
0086 BAF9            MOV     CLKVAL,#CV1MS
0088 1407            CALL    TIC
008A BB95            MOV     TCOUNT,#95H
008C FB      NBLOOP  MOV     A,TCOUNT        ;LOOK AT COUNT
008D C65B            JZ      BRKIN           ;   THIS IS THE START OF A VALID BREAK
008F 468C            JBRK    NBLOOP          ; CONTINUE TO VALIDATE NEXT BREAK
0091 0479            JMP     MAK2            ;      INVALID NEXT BREAK
```

ELECTRONIC CONNECTOR SWITCH
END OF PULSE TRAIN

```
                    ;THE CONTACTS ARE ON THE PROPER LEVEL AND IF FLAG IS 1 THE CONTACTS HAVE
                    ;ALSO BEEN ROTATED TO THE PROPER POSITION. IF F1=0 IT WILL BE SET TO 1 AND
                    ;BREAKS IN THE LOOP CAUSE THE ROTERY MAGNET TO OPERATE.
0093        LONGMAK EQU     $               ;END OF PULSE TRAIN
0093 7698           JF1     CCUTIN          ;TEST FOR ROTERY FINISHED
0095 B5             CPL     F1              ;SET FLAG TO DO ROTERY
0096 042E           JMP     SETCNT          ;DO SECOND PULSE TRAIN
```

ELECTRONIC CONNECTOR SWITCH
CONNECTOR CUTIN AND RING

```
                    ;THE PROGRAM ENDS UP HERE WHEN THE CONNECTOR HAS FINISHED THE SECOND
                    ;PULSE TRAIN. FIRST WE NEED TO FIND OUT IF THIS IS SELECTIVE RING OR
                    ;TRUNK & LEVEL
0098        CCUTIN  EQU     $               ;CUTIN FOR ANY CONNECTOR STARTS HERE
0098 08             INS     A,BUS           ;LOOK AT THE BUS BITS
0099 5302           ANL     A,#ZOPT         ;"Z" OPTION IS 1 OR 0 ?
009B 96A3           JZ1     TCUTIN          ;EXICUTE TRUNK & LEVEL CODE
                    ;THIS IS CODE FOR SELECTIVE RINGING CONNECTORS WHICH GROUND THE "EC" LEAD
                    ;TO CHOOSE THE RING FREQUENCY OF THE CALLED PARTY. THIS TYPE OF CONNECTOR
                    ;DOES NOT BACK UP OR 'READ' THE "EC" LEAD.
009D        SCUTIN  EQU     $
009D 26BF           JGCL    LNBUSY          ;THE CALLED PARTY LINE IS BUSY
009F 9A9F           ANL     P2,#NOT CWOT+ECOT ;SIEZE THE LINE, READY TO RING.
00A1 2402   TOLNRNG JMP     LNRING          ;EXIT TO RING THE LINE
                    ;THIS CODE IS FOR TRUNK AND LEVEL CONNECTORS WHICH HUNT FOR THE FIRST OPEN
                    ;OF MANY LINES. THE FIRST LINE IS MARKED WITH A GROUNDED "EC" LEAD AND THE
                    ;LAST LINE IS MARKED WITH A GROUNDED "EC" LEAD.
00A3        TCUTIN  EQU     $
00A3 26A9           JGCL    TCUTIN1         ;JMP IF THIS LINE IS BUSY
00A5 9ADF           ANL     P2,#NOT CWOT    ;SIEZE THE OPEN LINE
00A7 2402           JMP     LNRING          ;EXIT TO RING THE LINE
00A9        TCUTIN1 EQU     $
00A9 0A             IN      A,P2
00AA 5304           ANL     A,#ECIN         ;LOOK AT "EC" IF THE LINE IS BUSY
00AC 96BF           JOEC    LNBUSY          ;IF "EC" IS OPEN, IT'S JUST PLAIN BUSY
                    ;LINES WITH GROUNDED "EC" LEADS ARE THE FIRST OF A HUNTING GROUP.
                    ;SEQUENCIAL "C" LEADS ARE TO BE TESTED FOR AN OPEN LINE UNTIL THE NEXT
                    ;GROUNDED "EC" IS FOUND.
00AE FD     TCUTIN2 MOV     A,HPOS          ;WHERE ARE WE?
00AF 96B6           JNZ     TCUTIN3         ;MORE POSITIONS TO TEST ON THIS LEVEL
00B1 FC             MOV     A,VPOS          ;ARE THERE ANY MORE LEVELS?
00B2 C6BF           JZ      LNBUSY          ;EXIT HERE IS AN ERROR, DID NOT SEE END OF GRP
00B4 34CC           CALL    NXTLVL          ;GO UP TO NEXT TO CONTINUE SCAN
00B6        TCUTIN3 EQU     $
00B6 34B2           CALL    HORZ            ;DO A ROTATE
00B8 36A1           JOCL    TOLNRNG         ;GRAB THIS OPEN LINE AT LNRING
00BA 0A             IN      A,P2
00BB 5304           ANL     A,#ECIN         ;LOOK AT "EC" IF THE LINE IS BUSY
00BD 96AE           JOEC    TCUTIN2         ;IF "EC" IS OPEN KEEP HUNTING
00BF        LNBUSY  EQU     $
00BF 99F7           ANL     P1,#NOT BTRY    ;TURN ON BUSY TONE
00C1 043D           JMP     WFHUP
```

ELECTRONIC CONNECTOR SWITCH
CONNECTOR CUTIN AND RING

```
0100                ORG     100H
0100 04BF   TOBUSY  JMP     LNBUSY
                    ;WE ARE HERE BECAUSE THE WIPERS ARE ON AN UNBUSY LINE
                    ;IT IS TIME TO RING THE PHONE IF THE "PU" LEAD IS GROUNDED.

0102        LNRING  EQU     $
0102 BAB5           MOV     CLKVAL,#CV10MS  ;SET SLOW CLOCK           MES 3/16/84
0104 4615           JNLCD   LNRING2
0106 0A             IN      A,P2
0107 5308           ANL     A,#PU           ;CHECK THE PU LEAD
0109 C602           JNPU    LNRING          ;LOOP TIL "PU" GOES TO 1
010B 99FD           ANL     P1,#NOT RGRB    ;CLOSE RING RELAY
010D 34EC           CALL    DLY50
010F BAF9           MOV     CLKVAL,#CV1MS
0111 1407           CALL    TIC             ;FAST CLOCK
```

```
0113 241E              JMP     RNGREF          ;GET A REFERENCE PULSE
0115         LNRING2 EQU     $                 ;TEST FOR CALLER HANGUP
0115 BB01              MOV     TCOUNT,#1
0117 5602   LNRING3 JLCD    LNRING            ;BACK IF CURRENT IS BACK ON
0119 FB                MOV     A,TCOUNT
011A 9617              JNZ     LNRING3         ;LOOP TIL TIMEOUT
011C 249A              JMP     EOC             ;TIME UP, NO LCD...DUMP SWITCH

;WE WILL GET A TYPICAL ACTIVE LENGTH FOR REFERENCE AND MAKE SURE THAT IT
             ;IS TYPICAL BY COMPAIRING IT TO THE NEXT ONE IN LINE.
011E        RNGREF  EQU     $
011E 3455            CALL    MEASR             ;GET A LENGTH OR ERROR
0120 F69A            JC      EOC               ;END OF CALL IF CALER HANGS UP
0122 C676            JZ      TRIP              ;ACTIVE TOO LONG
0124 A8              MOV     REFRNG,A          ;SAVE AS A REFERENCE
0125 3455            CALL    MEASR
0127 F69A            JC      EOC
0129 C676            JZ      TRIP
012B AF              MOV     TSTRNG,A
012C 3441            CALL    CMPR              ;SEE IF THE REFERENCE IS TRUE
012E F61E            JC      RNGREF            ;TRY AGAIN

;THE FOLLOWING ACTIVE PERIODS WILL BE MEASURED UNTIL ONE IS LONGER OR
             ;SHORTER THAN THE VALID REFERENCE LENGTH OR UNTIL THE CALLING PARTY
             ;HANGS UP OR THE CALLED PARTY ANSWERS.
0130        RNGTST  EQU     $
0130 B904            MOV     PLSCNT,#4         ;MUST SEE FOUR IN A ROW
0132 3455   RNGTST1 CALL    MEASR             ;GET A LENGTH
0134 F69A            JC      EOC               ;IF CALLING PARTY HANGS UP
0136 C676            JZ      TRIP              ;BECAUSE OF ANSWER DURING SILENT PERIOD
0138 AF              MOV     TSTRNG,A
0139 3441            CALL    CMPR
013B E630            JNC     RNGTST            ;WAIT UNTIL ONE IS DIFFERENT
013D E932            DJNZ    PLSCNT,RNGTST1    ;NOT ENOUGH DIFFERENT
013F 2476            JMP     TRIP

;ROUTINES USED FOR RING TRIP
0141        CMPR    EQU     $                 ;SEE IF REFRNG AND TSTRNG ARE WITHIN 4MS
0141 F8              MOV     A,REFRNG
0142 0304            ADD     A,#04H
0144 57              DA      A
0145 37              CPL     A
0146 6F              ADD     A,TSTRNG
0147 37              CPL     A
0148 F654            JC      CMPR1             ;OUT OF LIMIT
014A FF              MOV     A,TSTRNG
014B 0304            ADD     A,#04H
014D 57              DA      A
014E 37              CPL     A
014F 68              ADD     A,REFRNG
0150 37              CPL     A
0151 F654            JC      CMPR1
0153 97              CLR     C
0154 83     CMPR1   RET                       ;'C' SET IF DIFFERENT

0155        MEASR   EQU     $
0155 BB01            MOV     TCOUNT,#1
0157 8661   MEASR0  JIDL    MEASR1
0159 FB              MOV     A,TCOUNT
015A 97              CLR     C
015B C675            JZ      MEASR4            ;TIME OVERFLOW
015D 466F            JNLCD   MEASR3            ;CALLING PARTY ON HOOK
ELECTRONIC CONNECTOR SWITCH
CONNECTOR CUTIN AND RING 015F 2457            JMP     MEASR0            ;WAIT FOR A REASON TO EXIT
0161 466F   MEASR1  JNLCD   MEASR3            ;LOST CALLING LOOP CURRENT
0163 8661            JIDL    MEASR1            ;WE DON'T MEASURE THE IDLE PERIOD
0165 BB01            MOV     TCOUNT,#1         ;SET UP TO MEASURE THE ACTIVE PERIOD
0167 97     MEASR2  CLR     C
0168 FB              MOV     A,TCOUNT
0169 C675            JZ      MEASR4            ;TIME OVERFLOW
016B 8675            JIDL    MEASR4            ;END OF ACTIVE
016D 5667            JLCD    MEASR2            ;KEEP COUNTING THE ACTIVE
016F 34EC   MEASR3  CALL    DLY50
```

```
0171 5657              JLCD    MEASR0
0173 97                CLR     C
0174 A7                CPL     C                       ;SET CARRY TO FLAG LOSS OF CALLER
0175 83       MEASR4   RET                             ;EXIT WITH MILLISECONDS OR ERROR FLAG

;THIS IS WHERE WE GO TO STOP THE RINGING AND WAIT FOR A HANGUP FROM
              ;EITHER SIDE

0176          TRIP     EQU     $
0176 8902              ORL     P1,#RGRB                ;OPEN THE RING RELAY
0178 997F              ANL     P1,#NOT FRLY            ;CUT THROUGH
017A 34F2              CALL    DLY20
017C 0A                IN      A,P2
017D 3283              JDLCD   WFEOC                   ;IF D IS UP WAIT FOR END
017F 8980              ORL     P1,#FRLY                ;RE-OPEN THE F
0181 2402              JMP     LNRING
0183
0183          WFEOC    EQU     $       ;WAIT HERE FOR THE END OF THE CALL
0183 0A                IN      A,P2
0184 5302              ANL     A,#DLCD
0186 C68A              JNDLCD  WFEOC1                  ;IF D ON HOOK TO 1 SEC COUNTER 04/18/84 MES
0188 5683              JLCD    WFEOC                   ;LOOP IF A OFF HOOK
018A BAB5     WFEOC1   MOV     CLKVAL,#CV10MS          ;SET SLOW CLOCK      04/18/84 MES
018C BB01              MOV     TCOUNT,#1               ;990 MS FROM OVERFLOW 04/18/84 MES
018E FB       WFEOC2   MOV     A,TCOUNT        ;                            04/18/84 MES
018F C69A              JZ      EOC             ;                            04/18/84 MES
0191 0A                IN      A,P2            ;                            04/18/84 MES
0192 5302              ANL     A,#DLCD         ;                            04/18/84 MES
0194 C68E              JNDLCD  WFEOC2          ;                            04/18/84 MES
0196 468E              JNLCD   WFEOC2          ;                            04/18/84 MES
0198 2483              JMP     WFEOC                   ;LCD BACK ON...NO DUMP 04/18/84 MES

;THE ONLY WAY TO GET HERE IS AT THE END OF THE CALL

019A          EOC      EQU     $
019A 237F              MOV     A,#7FH
019C 3A                OUTL    P2,A
019D 34A5              CALL    REL
019F 89FF              ORL     P1,#0FFH
01A1 0400              JMP     $

01A3 2402     RING     JMP     LNRING

ELECTRONIC CONNECTOR SWITCH
SUBROUTINES

;THESE ARE THE THREE MOTIONS THAT ALL SWITCHS CAN DO

01A5          REL      EQU     $       ;OPERATE THE RELEASE MAGNET
01A5 99EF              ANL     P1,#NOT RLSM            ;ENERGIZE THE COIL
01A7 34EE              CALL    DLY40                   ;FOR 40 MS
01A9 8910              ORL     P1,#RLSM                ;DE-ENERGIZE THE COIL
01AB BC0A              MOV     VPOS,#0AH               ;RESET VERTICAL POSITION
01AD BD0A              MOV     HPOS,#0AH               ;RESET HORIZONTAL POSITION
01AF 34F0              CALL    DLY30                   ;FOR 30 MS
01B1 93                RETR

01B2          HORZ     EQU     $       ;OPERATE THE ROTARY MAGNET
01B2 99DF              ANL     P1,#NOT RMAG            ;ENERGIZE THE COIL
01B4 34F2              CALL    DLY20                   ;FOR 20 MS
01B6 8920              ORL     P1,#RMAG                ;DE-ENERGIZE THE COIL
01B8 CD                DEC     HPOS                    ;ONE LESS POSITION LEFT
01B9 34F4              CALL    DLY10
01BB 5402              CALL    DLY3                    ;FOR 13 MS
01BD 93                RETR

01BE          VERT     EQU     $       ;OPERATE THE VERTICAL MAGNET
01BE 99BF              ANL     P1,#NOT VMAG            ;ENERGIZE THE COIL
01C0 34F0     VERT1    CALL    DLY30                   ;ENTRY POINT FOR NXTLVL <<<<
01C2 34FC              CALL    DLY6                    ;FOR 36 MS
01C4 8940              ORL     P1,#VMAG                ;DE-ENERGIZE THE COIL
01C6 CC                DEC     VPOS                    ;ONE LESS VERTICAL POSITION LEFT
01C7 34F4              CALL    DLY10
01C9 34F6              CALL    DLY9                    ;FOR 19 MS
01CB 93                RETR
```

```
;IN ADDITION, CONNECTORS OF THE TRUNK & LEVEL TYPE CAN BACKUP AND
;MOVE TO THE NEXT LEVEL TO CONTINUE THE SERCH FOR AN OPEN LINE.

01CC            NXTLVL  EQU     $
01CC 99FB               ANL     P1,#NOT VMHD    ;HOLD THE VERTICAL POSITION
01CE 34F4               CALL    DLY10
01D0 FC                 MOV     A,VPOS          ;SAVE THE VERTICAL POSITION
01D1 34A5               CALL    REL             ;BACK UP
01D3 34EE               CALL    DLY40           ;ADDITIONAL DELAY AFTER RELEASE
01D5 AC                 MOV     VPOS,A          ;RESTORE VERTICAL POSITION
01D6 99BF               ANL     P1,#NOT VMAG    ;APPLY NORMAL VERTICAL PULSE
01D8 8904               ORL     P1,#VMHD        ;REMOVE VERTICAL HOLD
01DA 24C0               JMP     VERT1           ;CONTINUE AS VERT ROUTINE

ELECTRONIC CONNECTOR SWITCH
SUBROUTINES

;DELAY ROUTINES

01DC 34E8       DLY275  CALL    DLY200
01DE 34EC       DLY75   CALL    DLY50
01E0 34F2       DLY25   CALL    DLY20
01E2 24FE               JMP     DLY5
01E4 34EA       DLY500  CALL    DLY100
01E6 34E8       DLY400  CALL    DLY200
01E8 34EA       DLY200  CALL    DLY100
01EA 34EC       DLY100  CALL    DLY50
01EC 34F4       DLY50   CALL    DLY10
01EE 34F4       DLY40   CALL    DLY10
01F0 34F4       DLY30   CALL    DLY10
01F2 34F4       DLY20   CALL    DLY10
01F4 5406       DLY10   CALL    DLY1
01F6 5406       DLY9    CALL    DLY1
01F8 5406       DLY8    CALL    DLY1
01FA 5406       DLY7    CALL    DLY1
01FC 5406       DLY6    CALL    DLY1
01FE 5406       DLY5    CALL    DLY1
0200 5406       DLY4    CALL    DLY1
0202 5406       DLY3    CALL    DLY1
0204 5406       DLY2    CALL    DLY1
0206 BE77       DLY1    MOV     DELAY,#077H
0208 EE08       LOOP    DJNZ    DELAY,LOOP
020A 93                 RETR

ELECTRONIC CONNECTOR SWITCH
SUBROUTINES 020B 434F5059           DB      'COPYRIGHT (C) 1983 CONWAY ENGINEERING INC.'
0235 36373520           DB      '675 HEGENBERGER RD'
0247 4F414B4C           DB      'OAKLAND, CA'
0000                    END

ELECTRONIC CONNECTOR SWITCH
---- SYMBOL TABLE ----

BLOOP   0052    DLY400  01E6    JNAB    R6      NBLOOP  008C    TCUTIN1 00A9
BRKIN   005B    DLY5    01FE    JNDLCD  R6      NXTLVL  01CC    TCUTIN2 00AE
BTRY    0008    DLY50   01EC    JNLCD   R6      PLSCNT  R1      TCUTIN3 00B6
CCUTIN  0098    DLY500  01E4    JNPU    R6      PU      0008    TIC     0007
CLKVAL  R2      DLY6    01FC    JOCL    R6      REFRNG  R0      TIMOUT  003B
CMPR    0141    DLY7    01FA    JOEC    R6      REL     01A5    TOBUSY  0100
CMPR1   0154    DLY75   01DE    JPU     R6      RESET   0017    TOEOC   0048
COUT   0000    DLY8    01F8    JTIME   R6      RESET1  0025    TOLNRNG 00A1
CRLY    0000    DLY9    01F6    JZ1     R6      RGRB    0002    TRIP    0176
CV10MS  00B5    ECIN    0004    LNBUSY  00BF    RING    01A3    TRUE    FFFF
CV1MS   00F9    ECOT    0040    LNRING  0102    RLSM    0010    TSTRNG  R7
CWOT    0020    EOB     006E    LNRING2 0115    RMAG    0020    VERT    01BE
DELAY   R6      EOC     019A    LNRING3 0117    RNGREF  011E    VERT1   01C0
DLCD    0002    FALSE   0000    LOCK    0027    RNGTST  0130    VMAG    0040
DLY1    0206    FRLY    0080    LOCK1   002A    RNGTST1 0132    VMHD    0004
DLY10   01F4    HORZ    01B2    LONGMAK 0093    SCUTIN  009D    VPOS    R4
DLY100  01EA    HPOS    R5      LOOP    0208    SECONDS R1      WFBRK   0034
DLY2    0204    INUSE   002C    MAK1    0074    SETCNT  002E    WFBRK1  0032
DLY20   01F2    JBRK    R6      MAK2    0079    SFEOB   0063    WFEOB   0067
DLY200  01E8    JDLCD   R2      MAK3    007D    SOBRK   004A    WFEOC   0183
DLY25   01E0    JFAB    R6      MEASR   0155    SONBRK  0084    WFEOC1  018A
```

| | | | | | | | | | |
|---|---|---|---|---|---|---|---|---|---|
| DLY275 | 01DC | J6CL | R6 | MEASR0 | 0157 | STHORZ | 0061 | WFEOC2 | 018E |
| DLY3 | 0202 | J6EC | R6 | MEASR1 | 0161 | STVERT | 005D | WFHUP | 0030 |
| DLY30 | 01F0 | JIDL | R6 | MEASR2 | 0167 | SUPY | 0080 | WFHUP1 | 003F |
| DLY4 | 0200 | JLCD | R6 | MEASR3 | 016F | TCOUNT | R3 | WFHUP2 | 0043 |
| DLY40 | 01EE | JMAK | R6 | MEASR4 | 0175 | TCUTIN | 00A3 | ZOPT | 0002 |

Having thus described preferred embodiments of the present invention, it will be appreciated by those skilled in the art to which the present invention pertains that many different and widely varying embodiments will be suggested without varying from the spirit and scope of the present invention. The disclosures presented herein are by way of preferred examples and are not in any sense to be considered as limiting of the scope and application of the present invention.

We claim:

1. A step by step switch assembly improved by the inclusion therein of an electronic controller conversion module, said switch assembly characterized by a two-motion step by step switch responsive to at least two consecutive trains of stepping pulses, including a wiper shaft supporting at least one wiper contact and mechanically biased to return to and remain at an index position, a lineal motion generating magnet for stepping said wiper shaft in a forward linear direction among available lineal contact row positions of spaced apart contact rows during a first operation wherein a contact row position level reached by the wiper is in accordance with the number of stepping pulses in the first of said trains, a rotary motion generating magnet for stepping said wiper shaft during a second operation in a rotary direction among available spaced apart positions of contacts of the row selected during said first operation until a selected contact is reached by the wiper in accordance with the number of pulses of the second of said trains, and a release magnet for returning said shaft to said index position during a third operation of said switch, said module comprising:

input connection means for connecting said module to a source of control signals including said trains, output driver means connected to said lineal motion generating magnet, said rotary motion generating magnet and said release magnet for applying current to operate each said magnet, and digital microcontroller means including a control program and connected to said input connection means and to said output driver means for receiving said pulse trains and for commanding said output driver means to operate said magnets in response to said pulses and in accordance with said control program.

2. The improved step by step switch assembly as set forth in claim 1 wherein the module thereof is packaged as a small printed circuit board for mounting within a housing of said step by step switch assembly in lieu of electromechanical control relays whose functions are replaced thereby.

3. The improved step by step switch assembly as set forth in claim 2 wherein said module includes instructions in said control program for operating the digital microcontroller means so that said step by step switch assembly may operate as a universal selector switch in a telephone system switch train.

4. The improved step by step switch assembly as set forth in claim 2 wherein said module includes instructions in said control program for operating the digital microcontroller means so that said step by step switch assembly may operate as a connector switch in a telephone system switch train.

5. The improved step by step switch assembly as set forth in claim 1 wherein said module includes programming means in said control program for automatically causing said wiper to wipe all contacts of each row in order to clean said contacts at predetermined intervals.

6. The improved step by step switch assembly as set forth in claim 1 and further comprising pulse processing means for analyzing said pulses and for automatically correcting for timing errors associated with incorrect timing of said pulses.

7. The improved step by step switch assembly as set forth in claim 1 and further comprising pulse detecting means for increasing loop sensitivity of a telephone service subscriber connection loop to extend the useful distance range of the subscriber service circuit loop to which the assembly is connected, said pulse detecting means including high impedance optoisolator means connected to said loop and coupled to said microcontroller means.

8. The improved step by step switch assembly as set forth in claim 3 and further comprising programmable digital absorption means for absorbing predetermined incoming pulse trains.

9. A method for electronic digital control of a step by step switch assembly characterized by a two-motion step by step switch responsive to at least two consecutive trains of stepping pulses, including a wiper shaft supporting at least one wiper contact and mechanically biased to return to and remain at an index position, a lineal motion generating magnet for stepping said wiper shaft in a forward linear direction among lineal contact row positions of spaced apart contact rows during a first operation wherein a contact row position level reached by the wiper is in accordance with the number of stepping pulses in the first of said trains, a rotary motion generating magnet for stepping said wiper shaft during a second operation in a rotary direction among available spaced apart positions of contacts of the row selectted during said first operation until a selected contact is reached by the wiper in accordance with the number of pulses of the second of said trains, and a release magnet for returning said shaft to said index position during a third operation of said switch, said method comprising the steps of:

receiving control signals including said trains, actuating said lineal motion generating magnet, said rotary motion generating magnet and said release magnet by selectively passing control currents therethrough by electronic switch means, and operating a digital microcontroller in accordance with a control program so that said microcontroller receives and processes said pulse trains and commands said electronic switch means to operate said magnets in response to precise control pulses generated in response to said pulse trains and in accordance with said program.

10. The method set forth in claim 9 comprising the further step of operating said digital microcontroller so that said magnets are operated periodically to move said wiper across all contacts of said rows in order to carry out periodic automatic cleaning thereof.

11. The method set forth in claim 9 comprising the further step of increasing loop sensitivity of a telephone service subscriber connection loop by monitoring loop conditions of said loop electronically through high impedance optoisolator means connected to said loop and coupled to said microcontroller.

12. The method set forth in claim 11 wherein said telephone service subscriber connection loop is a called party loop and said optoisolator means is connected to monitor ringing pulse waveshape and voltage amplitude on said called party loop in order to detect occurrence of an off hook condition at the location of the service subscriber of said loop.

13. The method set forth in claim 9 including the further step of absorbing incoming digit pulse trains by
   identifying each digit to be absorbed by providing a corresponding electrical connection to said microcontroller together with a control connection indicating the particular characteristics of the operation, such as absorb, absorb repeatedly, cut in/absorb, and so forth,
   comparing in said microcontroller each incoming digit with said electrical connection to determine of the incoming digit to be absorbed, and if so, operating a dial tone relay to remove dial tone when the absorbed digit is dialed but otherwise not operating either the lineal motion generating magnet or the rotary motion generating magnet in response to said absorbed digit.

14. A method for converting a step by step switch assembly to electronic digital control, said assembly being characterized by a base supporting a two-motion step by step switch responsive to at least two consecutive trains of stepping pulses, including a wiper shaft supporting at least one wiper contact and mechanically biased to return to and remain at an index position, a lineal motion generating magnet for stepping said wiper shaft in a forward linear direction among lineal contact row positions of spaced apart contact rows during a first operation wherein a contact row position level reached by the wiper is in accordance with the number of stepping pulses in the first of said trains, a rotary motion generating magnet for stepping said wiper shaft during a second operation in a rotary direction among available spaced apart positions of contacts of the row selected during said first operation until a selected contact is reached by the wiper in accordance with the number of pulses of the second of said trains, and a release magnet for returning said shaft to said index position during a third operation of said switch, said method comprising the steps of:
   removing all electromechanical control relays from said base other than said lineal, rotary and release magnets,
   installing and connecting an electronic controller conversion module formed on a small printed circuit card by mounting said card on said base in place of said removed relays,
   providing said module with input control signal processing means connectable for receiving control signals including said trains,
   providing output control electronic switch means for actuating said lineal motion generating magnet, said rotary motion generating magnet and said release magnet in response to precise control signals, and
   providing a digital microcontroller and a stored control program enabling said microcontroller to generate and put out said precise control signals to said electronic switch means to cause said magnets to operate in response to said signals, in accordance with said program.

* * * * *